(12) United States Patent
Podkamien et al.

(10) Patent No.: US 10,110,075 B2
(45) Date of Patent: Oct. 23, 2018

(54) SYSTEM AND METHOD FOR SELECTING POWER TRANSMITTERS ACROSS A WIRELESS POWER COUPLING

(71) Applicant: POWERMAT TECHNOLOGIES LTD., Neve Ilan (IL)

(72) Inventors: Ian Podkamien, Petach Tikva (IL); Amir Salhuv, Rehovot (IL)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 151 days.

(21) Appl. No.: 15/036,990

(22) PCT Filed: Nov. 12, 2014

(86) PCT No.: PCT/IL2014/050982
§ 371 (c)(1),
(2) Date: May 16, 2016

(87) PCT Pub. No.: WO2015/071902
PCT Pub. Date: May 21, 2015

(65) Prior Publication Data
US 2016/0294227 A1    Oct. 6, 2016

Related U.S. Application Data

(60) Provisional application No. 61/903,977, filed on Nov. 14, 2013, provisional application No. 61/931,823, filed on Jan. 27, 2014.

(51) Int. Cl.
*H01F 27/42* (2006.01)
*H01F 27/00* (2006.01)
(Continued)

(52) U.S. Cl.
CPC .............. *H02J 50/80* (2016.02); *H02J 5/00* (2013.01); *H02J 7/00* (2013.01); *H02J 7/025* (2013.01);
(Continued)

(58) Field of Classification Search
CPC .. B60L 11/18; B60L 11/1829; Y02T 10/7005; Y02T 10/7072; Y02T 90/14; H02J 7/025; H02J 50/80
See application file for complete search history.

(56) References Cited

U.S. PATENT DOCUMENTS 6,632,033 B1 * 10/2003 Saleh ................ H04B 10/40
398/139
7,208,912 B2 * 4/2007 Ghabra .............. H02J 50/12
320/108
(Continued)

FOREIGN PATENT DOCUMENTS

WO    2007090168 A2    8/2007
WO    2010118191 A1    10/2010
(Continued)

*Primary Examiner* — Alfonso Perez Borroto
*Assistant Examiner* — Esayas Yeshaw
(74) *Attorney, Agent, or Firm* — William Dippert; Laurence Greenberg; Werner Stemer

(57) ABSTRACT

Aspects of the present invention relates to providing devices, a system and method for controlling wireless power transfer across an inductive power coupling. The system, particularly, relates to enabling selection of a wireless power outlet of a multi-outlet power transmission surface closest to the location of a power receiver connected to an electric load and placed upon the surface. Accordingly, the multi-outlet power transmission surface comprising two sub-systems, a power transmission system and a signal transfer system, each operable independently and continuously. Further, the signal transfer system controls the activation of wireless power, configured to analyze the signal-quality of each
(Continued)

detected communication signal received from a power receiver and thereby to identify the wireless power outlet closest to the location of the power receiver.

23 Claims, 23 Drawing Sheets

(51) Int. Cl.
    *H01F 38/00*     (2006.01)
    *H02J 50/80*     (2016.01)
    *H02J 5/00*     (2016.01)
    *H02J 7/00*     (2006.01)
    *H02J 50/90*     (2016.01)
    *H02J 50/12*     (2016.01)
    *H02J 50/40*     (2016.01)
    *H02J 7/02*     (2016.01)

(52) U.S. Cl.
    CPC ............. *H02J 50/12* (2016.02); *H02J 50/40* (2016.02); *H02J 50/90* (2016.02)

(56) References Cited

U.S. PATENT DOCUMENTS

| | | |
|---|---|---|
| 7,948,208 B2 | 5/2011 | Partovi et al. |
| 8,090,550 B2* | 1/2012 | Azancot ................. H02J 5/005 702/62 |
| 9,231,411 B2 | 1/2016 | Baarman et al. |
| 2002/0181404 A1* | 12/2002 | Insler .................. H04L 27/2601 370/241 |
| 2009/0079269 A1* | 3/2009 | Jin .......................... H02J 5/005 307/104 |
| 2012/0071091 A1* | 3/2012 | Azancot .................. H02J 5/005 455/41.1 |
| 2012/0142967 A1* | 6/2012 | DeMattei ................ C07C 17/16 564/376 |
| 2012/0161530 A1 | 6/2012 | Urano |
| 2013/0035126 A1 | 2/2013 | Kim et al. |
| 2013/0119773 A1 | 5/2013 | Davis |
| 2013/0134927 A1 | 5/2013 | Park et al. |
| 2014/0346888 A1 | 11/2014 | Kim et al. |
| 2014/0368053 A1 | 12/2014 | Lee et al. |
| 2015/0222330 A1* | 8/2015 | Rapakko .............. H04B 5/0037 307/104 |

FOREIGN PATENT DOCUMENTS

| | | |
|---|---|---|
| WO | 2013006004 A2 | 1/2013 |
| WO | 2013111917 A1 | 8/2013 |

* cited by examiner

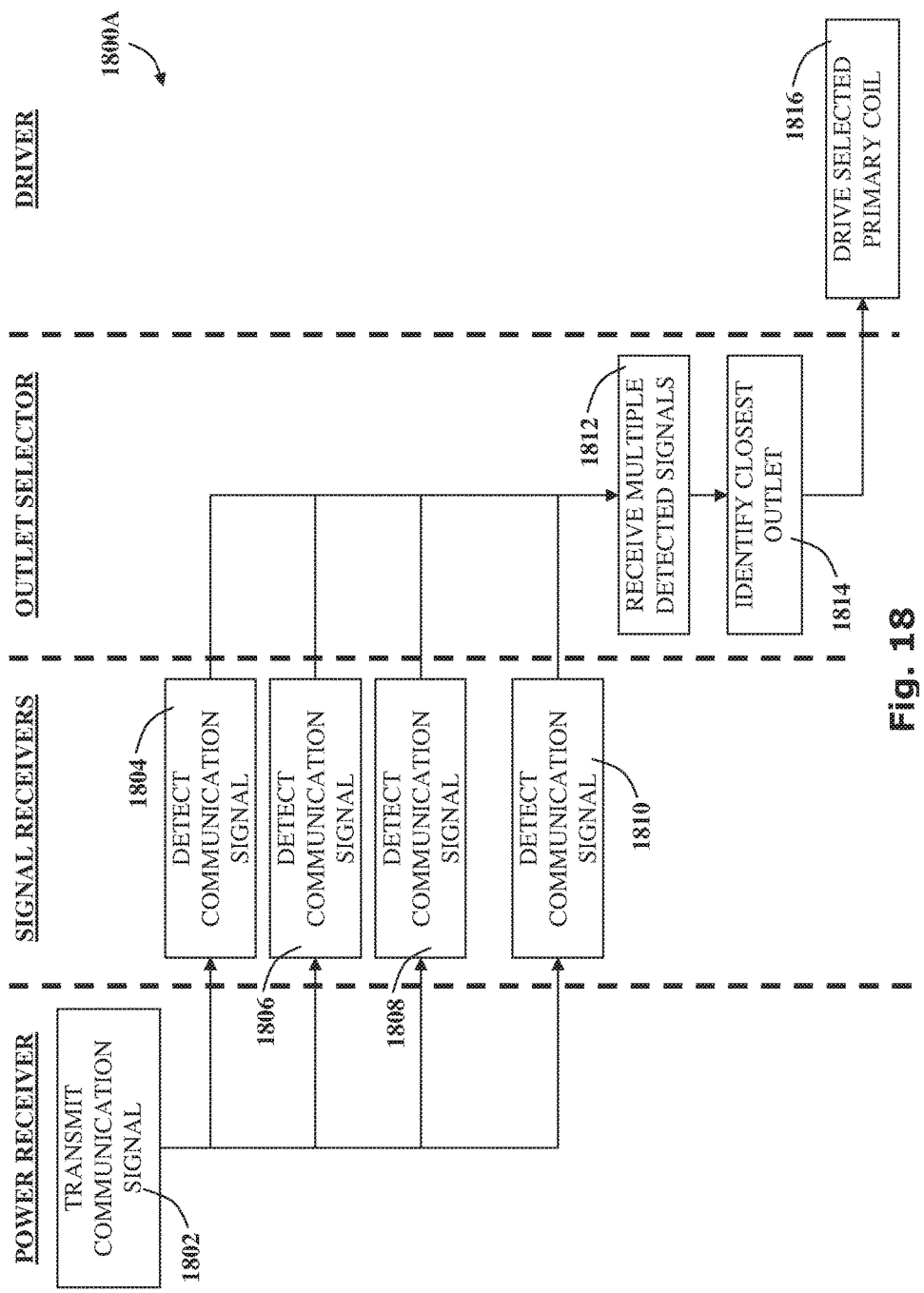

SYSTEM AND METHOD FOR SELECTING POWER TRANSMITTERS ACROSS A WIRELESS POWER COUPLING

CROSS-REFERENCE TO RELATED APPLICATIONS

This application is a U.S. National Phase Application under 35 U.S.C. § 371 of International Patent Application No. PCT/IL2014/050982, which has an international filing date of Nov. 12, 2014, and which claims priority and benefit of the filing dates of U.S. Provisional Patent Application Ser. No. 61/903,977, filed Nov. 14, 2013, and U.S. Provisional Patent Application Ser. No. 61/931,823, filed Jan. 27, 2014, the disclosures of which are incorporated herein by reference in their entirety.

FIELD OF THE INVENTION

The present invention is directed to controlling power transmitter selection across a wireless power coupling surface. In particular, the disclosure relates to enabling automatic selection of a wireless power outlet closest to a power receiver when placed upon a multi-outlet transmission surface.

BACKGROUND OF THE INVENTION

For safety, the power supplying side of a conductive couple is generally the female part, and does not have bare conductive elements protruding therefrom. A plug coupled to the device is the corresponding male part with bare pins. The size of the pins and holes are such that a child cannot insert his or her fingers thereinto. In high quality sockets, an earth connection is provided, and, only when a plug with a longer earth pin is inserted thereinto, is it possible to insert a pin (or anything else) into the holes connected to the current carrying live and neutral wires. Nevertheless, socket holes are dangerous and children do sometimes manage to insert pencils, pins and other objects into socket holes, sometimes with fatal results. Water can also cause shorting and may result in electrocution.

It can therefore be safer and more reliable to provide socket-less power outlets such as inductive couplers. Inductive power coupling allows energy to be transferred from a power supply to an electric load without connecting wires. A power supply is wired to a primary coil and an oscillating electric potential is applied across the primary coil which induces an oscillating magnetic field therearound. The oscillating magnetic field may induce an oscillating electrical current in a secondary coil, placed close to the primary coil. In this way, electrical energy may be transmitted from the primary coil to the secondary coil by electromagnetic induction without the two coils being conductively connected. When electrical energy is transferred inductively from a primary coil to a secondary coil, the pair are said to be inductively coupled. An electric load wired in series with such a secondary coil may draw energy from the power source when the secondary coil is inductively coupled to the primary coil.

Inductive electrical power transmission systems over extended surfaces are not new. One such example is described in U.S. Pat. No. 7,164,255 to Hui. In Hui's system a planar inductive battery charging system is designed to enable electronic devices to be recharged. The system includes a planar charging module having a charging surface on which a device to be recharged is placed. Within the charging module, and parallel to the charging surface, at least one, and preferably an array of primary windings are provided. These couple energy inductively to a secondary winding formed in the device to be recharged. Such systems are adequate for charging batteries in that they typically provide a relatively low power inductive coupling. It will be appreciated however, that extended base units such as Hui's charging surface which transmit energy continually approximately uniformly over the whole area of the unit, are not suitable for use with high energy systems.

By not requiring holes for coupling pins, socket-less outlets may be disguised more effectively than conductive sockets, and are thus less obtrusive. A primary inductive coil, for example, may be concealed behind a surface. Generally, the fact that socket-less outlets are less obtrusive is advantageous. But being harder to spot than conventional power outlets has its disadvantages. The user must somehow locate the outlet before being able to use it by bringing a secondary coil into proximity therewith. The problem of locating such sockets is particularly acute where the power outlets and its associated coil is behind a plastic or similar material in a charging device or are behind a concealing surface such as a desk top or wall, and the positions thereof are adjustable over a large area.

Locating mobile source 'hotspots' or sockets is particularly problematic in high power systems where no extended power transmission surface is provided. Moreover, a high power primary coil produces a large oscillating magnetic field. Where a secondary coil is inductively coupled to the primary coil, the resulting flux linkage causes power to be drawn into the secondary coil. Where there is no secondary coil to focus the power, the oscillating magnetic field causes high energy electromagnetic waves to be transmitted which may be harmful to bystanders. In contrast to low power systems, such as Hui's charging surface, where excess heat may be readily dissipated, uncoupled high power primary coils and their surroundings may become dangerously hot.

In order to provide power to electrical devices in an efficient manner it is important that certain parameters of the power are regulated. By feeding back such parameters as working voltage, current, temperature and the like, the power supply to an electric device may be optimized to minimize energy losses and to prevent excessive heating of the components. Consequently, it may be useful to provide a signal transfer channel for power regulation and the like. Thus a communication channel between source and load device is often provided alongside the power input channel in conventional conductive power supply systems. Methods for providing such a communication channel include wired connections to the device that are often packaged in the same cable as the power lines and conductively coupled to the load via conventional pin-and-socket type connectors.

Leak prevention systems which are able to detect power emanating from a primary coil of an inductive power source and to cut off power to the primary coil if no secondary coil is coupled thereto have been considered. However in order to prevent power leakage from a primary coil while a secondary coil is coupled thereto, a communication channel between the secondary and primary coil would be useful. Nevertheless due to the lack of connecting wires in inductive power couplings, conductive communication channels are not practical.

There is a need for a control system for wireless power outlets, which is capable of locating a concealed power outlet, preventing power leakage from the power outlet, locating secondary coils close to the power outlet and regulating power transfer from the power outlet to a secondary coil coupled thereto. The present invention addresses this need.

The efficient use of available energy is of great importance for a number of reasons. On a global scale, there is increasing concern that the emission of greenhouse gases such as carbon dioxide from the burning of fossil fuels may precipitate global warming. Moreover, energy resources are limited. The scarcity of global energy resources alongside geopolitical factors drives the cost of energy upwards. Thus efficient use of energy is an ever more important budget consideration for the energy consumer.

Energy losses in electrical energy transmission are chiefly due to the incidental heating of current carrying wires. In many cases this is unavoidable, as current carrying wires are essential for the powering of electrical devices and current carrying wires have resistance. It is the work done to overcome this resistance which generates heat in the wires.

In other cases the energy losses are unnecessary. For example, electrical devices are often left running unnecessarily and energy used to power devices which are not being used is truly wasted. Various initiatives aimed at reducing the amount of energy wasted by idle devices have been proposed. For example, Energy Star is a joint program of the United States Environmental Protection Agency and the United States Department of Energy which awards manufacturers the right to display a recognizable label on products which meet certain energy consumption standards. Energy Star attempts to reduce energy consumption through better energy management.

Efficient energy management reduces energy wastage. For example, laptop computers, which rely upon a limited amount of energy supplied from onboard power cells, use a variety of strategies for keeping power consumption to a minimum. Thus the screen and hard drives are switched off automatically after the computer has been left inactive for a significant length of time, similarly the network card may be disabled when the computer is disconnected from the mains or from a network. Such energy management strategies may serve to increase the length of time that a device can be powered by its onboard cells.

Even when connected to the mains, however, efficient use of energy is essential. Many common electrical devices run on low voltage DC and typically use a transformer with an AC-DC power adapter to control the power provided to it. Energy Star estimates that 1.5 billion such power adapters are used in the United States alone for devices such as MP3 players, Personal Digital Assistants (PDAs), camcorders, digital cameras, emergency lights, cordless and mobile phones. According to Energy Star, such power adapters draw about 300 billion kilowatt-hours of energy every year which is approximately 11% of the United States' national electric bill.

If multiple devices could be run from a single power adapter this would greatly reduce the number of power adapters in use. However, the supply of electricity to a number of devices through a single cable is not trivial. The more devices that are connected to a single power strip the greater the current which is drawn by the strip. Thus the current supplied through the single cable connecting the power strip to the mains increases.

Power losses due to the heating of a cable increase according to the square of the current it carries so energy losses from the cable may increase parabolically. Furthermore, in the absence of effective energy management, if too many devices draw current from a single cable the current supplied may exceed the permitted level thereby tripping a circuit breaker or blowing a fuse. Even more seriously, the excessive current may lead to overheating of the cable which is a common cause of fire.

A further unnecessary usage of energy is in powering of devices having onboard power cells. When an electric device having rechargeable cells such as a laptop computer, electric shaver or the like, is connected to the mains power is drawn both to operate the device and also to recharge the cells. Although electrical cells do need to be recharged periodically, even partially charged cells are sufficient to power the device. It is unnecessary therefore to continuously charge the onboard cell.

Furthermore, the energy needlessly consumed charging electrical cells beyond the level necessary for operation of a device increases electricity bills. This is of particular concern where a large number of such devices are being used simultaneously. For example for a company which hosts a meeting or a conference where many individual laptop computers are being used simultaneously.

Inductive power coupling allows energy to be transferred from a power supply to an electric load without a wired connection therebetween. An oscillating electric potential is applied across a primary inductor. This sets up an oscillating magnetic field in the vicinity of the primary inductor. The oscillating magnetic field may induce a secondary oscillating electrical potential in a secondary inductor placed close to the primary inductor. In this way, electrical energy may be transmitted from the primary inductor to the secondary inductor by electromagnetic induction without a conductive connection between the inductors.

When electrical energy is transferred from a primary inductor to a secondary inductor, the inductors are said to be inductively coupled. An electric load wired in series with such a secondary inductor may draw energy from the power source wired to the primary inductor when the secondary inductor is inductively coupled thereto.

The strength of the induced voltage in the secondary inductor varies according to the oscillating frequency of the electrical potential provided to the primary inductor. The induced voltage is strongest when the oscillating frequency equals the resonant frequency of the system. The resonant frequency $f_R$ depends upon the inductance L and the capacitance C of the system according to the equation $$f_R = \frac{1}{2\pi\sqrt{LC}}.$$

Known inductive power transfer systems typically transmit power at the resonant frequency of the inductive couple. This can be difficult to maintain as the resonant frequency of the system may fluctuate during power transmission, for example in response to changing environmental conditions or variations in alignment between primary and secondary coils.

Amongst others, one problem associated with resonant transmission is the high transmission voltages involved. At high operating voltages, a large amount of heat may be generated by the system resulting in high power losses as well as damage to heat sensitive components. Accordingly, capacitors and transistors in the resonant circuits may need to be relatively large.

The need remains therefore for an energy efficient inductive power transfer system which may incur lower power losses during operation. The current disclosure addresses this need.

SUMMARY OF THE INVENTION

It is according to a first aspect of the disclosure, a method is taught for selecting a wireless power outlet from a multi-outlet power transmission surface for transferring power to at least one power receiver having a secondary coil connectable to an electric load, wherein the at least one power receiver is configured to transmit communication signals, and the multi-outlet power transmission surface comprises: a power transmission system, comprising an array of wireless power outlets, each of the power outlet is associated with a primary coil connectable to a driver; and a signal transfer system comprising: at least one signal receiver unit associated with each of the power outlets of the array, and a signal processing unit in communication with the at least one signal receiver unit, the method operable on the signal transfer system comprising the steps of: detecting the communication signals from the at least one power receiver; analyzing signal-quality of each of the detected communication signals; and selecting the wireless power outlet having the detected communication signal with required signal-quality. Optionally the required signal-quality may be the highest signal-quality received, the lowest signal-quality received or a signal-quality having the best characteristics.

The method may further comprise the step of activating the primary coil associated with the selected wireless power outlet.

Optionally, the step of analyzing signal-quality is determined by obtaining a signal-to-noise-ratio (SNR) value of each of the detected communication signals. The step of obtaining the signal-to-noise-ratio (SNR) value of each of the detected communication signal comprises the sub-steps of: obtaining original communication signal profile; obtaining received communication signal profile; and computing a deviation value of the received communication signal profile from the original communication signal profile, wherein the deviation value is based upon at least one of: level of power reduction over time, shift of frequency and signal's frequency phase shift/rotation.

Optionally, the step of analyzing signal-quality may comprise applying frequency filters to the detected communication signals, where the step of applying frequency filters comprises: performing a Fast Fourier Transform (FFT) to said detected communication signals; and filtering for known communication signal frequencies.

Optionally, the step of selecting the wireless power outlet having the detected communication signal with optimal signal-quality post signal processing comprises identifying the wireless power outlet closest to the location of said at least one power receiver.

Optionally, the step of activating the primary coil associated with the identified wireless power outlet comprises the step of transmitting a control signal to the driver. Accordingly, the driver receiving the control signal driving the primary coil may transfer power to the secondary coil of the at least one power receiver.

Optionally, the signal transfer system method further comprises the step of performing digital signal analysis of the signal-to-noise-ratio.

Optionally, the signal transfer system method further comprises the step of monitoring the signal-quality of detected communication signals continuously during power transmission such that any displacement of the at least one power receiver is detectable.

Optionally, the signal transfer system method further comprises the steps of: selecting at least a second wireless power outlet; and swapping the selected wireless power outlet with at least the second wireless power outlet.

Optionally, the step of selecting the wireless power outlet having the detected communication signal with required signal-quality further comprises selecting multiple wireless power outlets. Where appropriate, selecting multiple wireless power outlets further comprises activating the multiple wireless power outlets selected and may further allow de-activating the multiple wireless power outlets selected.

The aspect of the multi-outlet power transmission surface is further elaborated. The surface for transmitting power wirelessly to at least one power receiver having a secondary coil connectable to a power load, where the at least one power receiver is configured to transmit communication signals, the power transmission surface comprising: a power transmission system, comprising an array of wireless power outlets, each power outlet is associated with a primary coil connectable to a driver wired to a power source, the primary coil connected inductively to the secondary coil when activated; a signal transfer system, comprising at least one signal receiver unit associated with each power outlet of the array, the signal receiver unit operable to detect the communication signals via its associated power outlet; and a processing unit in communication with the at least one signal receiver unit; wherein the processing unit is operable to analyze signal-quality of each detected communication signal and thereby to identify the wireless power outlet closest to the location of the at least one power receiver.

Where appropriate, the signal-quality is determined by obtaining a signal-to-noise-ratio (SNR) value of each detected communication signal. Optionally, obtaining the optimal signal comprises computing a value based upon at least one of the level of power reduction over time, the shifting of frequency and signal's frequency phase shift/rotation.

Where appropriate, the signal-quality is determined by applying frequency filters to the detected communication signals.

Optionally, wherein applying frequency filters comprises performing a Fast Fourier Transform (FFT) to the detected communication signals and filtering for known communication signal frequencies.

Accordingly, wherein the wireless power outlet closest to the location of the at least one power receiver is identified by comparing the SNR value of the detected communication signals.

Where appropriate, the signal transfer system is further operable to perform digital signal analysis of the signal-to-noise-ratio. Further, the signal transfer system is operable to monitor the signal-quality of the detected communication signals continuously during power transmission such that any displacement of the at least one power receiver is detectable. It is further noted that the system may be operable to detect receiver displacements even without any special triggering by the primary coils. Rather the system may detect receiver displacement through an ongoing analysis of control signaling from the secondary coil.

Optionally, the multi-outlet power transmission surface, further comprises a controller in communication with the signal processing unit, the controller is operable to activate the wireless power outlet closest to the location of the at least one power receiver.

Where appropriate, the multi-outlet power transmission surface, wherein the signal transfer system is operable to select at least a second wireless power outlet and to swap said selected wireless power outlet with at least said second wireless power outlet.

Optionally, the signal transfer system of the multi-outlet power transmission surface, wherein is further operable to select multiple wireless power outlets.

Optionally, the signal transfer system of the multi-outlet power transmission surface is further operable to activate the selected multiple wireless power outlets to provide wireless power to multiple power receivers.

Optionally, the signal transfer system of the multi-outlet power transmission surface is further operable to de-activate the selected multiple wireless power outlets.

Another aspect of the invention is directed to providing signal transfer system for controlling power transfer across an inductive power coupling, said inductive power coupling comprising a primary inductive coil wired to a power source and a secondary inductive coil wired to an electric load; said system comprising:
 at least one signal generator for generating a control signal;
 at least one transmitter for transmitting said control signal, and
 at least one receiver for receiving said control signal.

Optionally, the control signal for carrying encoded data pertains to at least one of the group comprising, inter alia:
 presence of said electric load;
 location of said primary inductive coil;
 location of said secondary inductive coil;
 required operating voltage for said electric load;
 required operating current for said electric load;
 required operating temperature for said electric load;
 required operating power for said electric load;
 measured operating voltage for said electric load;
 measured operating current for said electric load;
 measured operating temperature for said electric load;
 measured operating power for said electric load;
 power delivered to said primary inductive coil;
 power received by said secondary inductive coil, and
 a user identification code.

In one embodiment, the signal generator comprises a transmission circuit connected to the secondary inductive coil; the transmitter comprising the secondary inductive coil, and the receiver comprising the primary inductive coil connected to a reception circuit wherein: said transmission circuit comprises an ancillary load selectively connectable to said secondary inductive coil, and said reception circuit comprises at least one power monitor for monitoring power provided to said primary inductive coil.

In one embodiment, the transmission circuit further comprises at least one switching unit comprising: a modulator for modulating a bit-rate signal with an input signal to create a modulated signal; and a switch for intermittently connecting said ancillary load to said secondary inductive coil according to said modulated signal, and said reception circuit further comprises: at least one current monitor for monitoring a primary current drawn by said primary inductive coil, thereby producing a primary current signal, and at least one correlator for cross-correlating said primary current signal with said bit-rate signal, thereby producing an output signal.

The signal transfer system may be further characterized by at least one of the following restrictions:
 said switching unit further comprises a controller configured to encode data into said input signal;
 said switching unit further comprises a frequency divider;
 said inductive power coupling transfers energy with a driving frequency and said bit rate frequency is an integer fraction of said driving frequency;
 said inductive power coupling is a device selected from the group comprising: a transformer, a DC-to-DC converter, an AC-to-DC converter, an AC-to-AC converter, a flyback transformer, a flyback converter, a full-bridge converter, a half-bridge converter and a forward converter; and
 said primary inductive coil is galvanically isolated from said secondary inductive coil.

In another embodiment, the transmission circuit further comprises a half-wave rectifier, and the reception circuit is configured to detect second harmonic signals in the power supplied to said primary inductive coil when said secondary inductive coil is coupled thereto.

Optionally, a plurality of the primary inductive coils are each connected to a driver and the driver is configured to selectively operate each primary inductive coil in turn so as to identify which primary inductive coil is closest to the secondary inductive coil.

Optionally, each primary inductive coil is operable at a plurality of power levels and said driver is configured to selectively operate each primary inductive coil at a low power until the primary inductive coil closest to said secondary inductive coil is identified and then to operate said primary inductive coil closest to said secondary inductive coil at a high power.

A second aspect of the invention is directed to an efficiency monitor for monitoring the efficiency of said power transfer comprising the signal transfer system described hereinabove; the efficiency monitor further comprising: at least one input power monitor for measuring the input power delivered to said primary inductive coil; at least one output power monitor for measuring the output power received by said secondary inductive coil; at least one processing unit for determining an index of power-loss, and at least one communication channel for communicating said input power and said output power to said processing unit.

Typically, the efficiency monitor is further characterized by at least one of the following restrictions:
 the efficiency monitor additionally comprises at least one circuit-breaker for disconnecting said primary inductive coil from said power supply;
 the input power monitor is incorporated into an inductive power outlet;
 the output power monitor is incorporated into an electric device;
 the index of power-loss is an efficiency quotient Q, defined as the ratio of said output power to said input power;
 the index of power-loss is an efficiency differential Δ, defined as the difference between said output power and said input power, and
 the efficiency monitor additionally comprises hazard detectors in communication with said processing unit.

Optionally, the efficiency monitor is incorporated into an electric device that further comprises at least one said transmitter for transmitting said output power to said receiver.

Optionally, the transmitter is selected from the group comprising: light emitting diodes, radio transmitters, optocouplers, mechanical oscillators, audio sources, ultrasonic transducers and ancillary load transmission circuits.

The signal transfer system may be incorporated into a power outlet locator for locating an inductive power outlet, said power outlet comprising at least one said primary inductive coil and at least one said transmitter; the system further comprising:

at least one sensor for detecting said control signal;
at least one processing unit or equivalent logic, or by an external processing unit connected to the system for receiving a sensor signal from said at least one sensor and computing at least one coordinate of a location of said power outlet, and
at least one user interface for receiving a signal from said processing unit and communicating said location to a user.

Typically, the power outlet locator is further characterized by at least one of the following restrictions:
the at least one sensor being selected to detect an electromagnetic field generated by at least one said primary inductive coil;
the processing unit calculates the distance between said sensor and said power outlet by comparing the intensity of said control signal received by the sensor with a reference value;
the processing unit determines the direction of said power outlet by comparing the relative intensities of said control signal as detected by a plurality of said sensors;
the location of said power outlet being encoded into said control signal and decoded by said processing unit;
the user interface comprises a visual display for indicating the location of said power outlet, and
the user interface comprises an audible signal.

In one embodiment, the power outlet locator is incorporated into an electrical device.

Optionally, the electrical device is further characterized by at least one of the following restrictions:
the electrical device additionally comprises at least one said secondary inductive coil for powering said electrical device;
the electrical device additionally comprises at least one electrochemical power cell for powering said electrical device and at least one said secondary inductive coil wired to said electrochemical cell via a rectifier for charging said electrochemical power cell, and
the electrical device is selected from the group comprising: telephones, personal digital assistants (PDAs), cameras, media players, computers, keyboards and cursor controllers.

A further aspect of the invention is directed to providing a method for transmitting a control signal through an inductive energy coupling comprising a primary inductive coil connected to a power source and a secondary inductive coil connected to an electric load, said method comprising:
providing an input signal;
providing a bit-rate signal;
modulating the bit-rate signal with the input signal to create a modulated signal;
connecting an ancillary load to said secondary inductive coil intermittently according to said modulated signal;
monitoring a primary current drawn by said primary inductive coil and producing a primary current signal, and
cross-correlating said primary current signal with said bit-rate signal to generate an output signal.

A further aspect of the invention is directed to providing a method for monitoring the efficiency of power transmission by an inductive power outlet comprising at least one primary inductive coil wired to a power supply for inductively coupling with a secondary inductive coil wired to an electric device, said method comprising the steps of:
measuring the input power delivered to said primary inductive coil;
measuring the output power received by said electric device;
communicating said input power to a processing unit;
communicating said output power to said processing unit, and
said processing unit determining an index of power-loss.

In one specific method, a working range of values for said index of power-loss is predetermined, and the method comprises the further step of: disconnecting said primary inductive coil from said power supply if said index of power-loss falls outside said working range of values.

BRIEF DESCRIPTION OF THE DRAWINGS

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings:

FIG. 18 is a flowchart representing selected actions of a possible method for selecting the closest wireless power outlet and driving its associated primary inductor;

DETAILED DESCRIPTION

Figure 1:
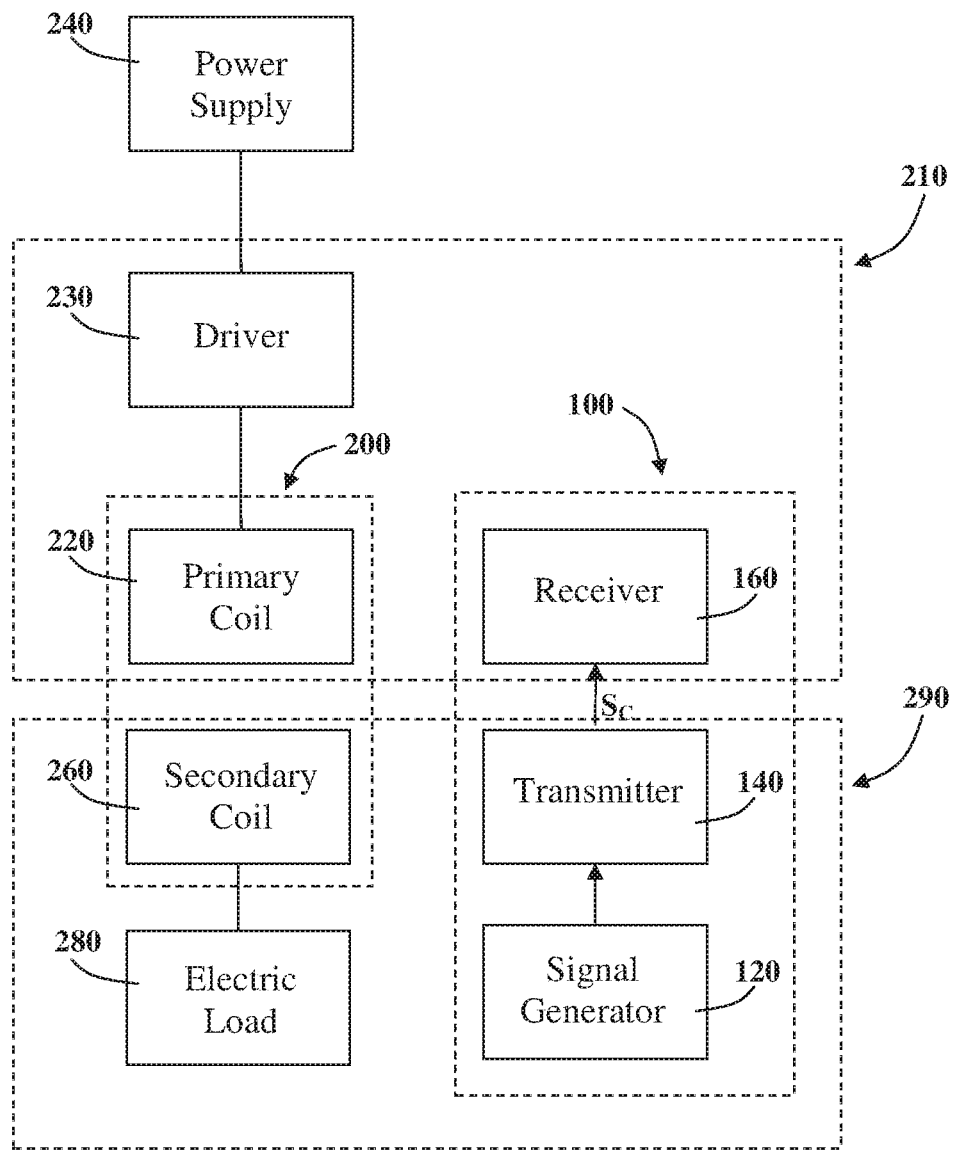
FIG. 1 is a block diagram showing the main elements of an inductive power coupling incorporating a signal transfer system according to a first embodiment of the invention.

Aspects of the present invention relate to providing devices, systems and methods for controlling wireless power transfer across an inductive power coupling. In particular, the disclosure relates to enabling selection of a wireless power outlet from a multi-outlet power transmission surface such that the selected outlet is closest to the location of a power receiver upon the surface.

It is noted that as used herein, with regard to selection of a wireless power outlet from a multi-outlet power transmission surface, wherein referencing to "the closest", is based upon signal communication analysis and may refer to the closest effective location, not necessarily the closest physical location.

The multi-outlet power transmission surface may comprise two sub-systems, a power transmission system and a signal transfer system, each operable independently and continuously. Further, the signal transfer system controls the activation of wireless power transfer, by analyzing the signal-quality of each detected communication signal received from a power receiver and thereby identifying the wireless power outlet closest to the location of the power receiver.

The power transmission system may comprise an array of wireless power outlets. Each of the power outlets is associated with a primary coil connectable to a driver wired to a power source. The primary coil may be connected inductively to a secondary coil, and when activated is operable to transfer power wirelessly. The secondary coil may be associated with a power receiver connectable to a power load. The power receiver may be configured to transmit communication signals, which can be analyzed by the signal transfer system to determine signal-quality to enable activation of the primary coil of the effectively closest wireless power outlet.

The signal transfer system architecture may comprise at least one signal receiver unit associated with each power outlet of the array and a processing unit in communication with the signal receiver unit. Accordingly, the signal receiver unit is operable to detect communication signals of a power receiver, and the processing unit is operable to analyze the signal-quality of each detected communication signal and thereby to identify the wireless power outlet closest to the location of the power receiver.

In particular, the system of the current disclosure may provide parallel functioning of the signal transfer system and the power transmission system, operable to monitor continuously, the signal-quality of the detected communication signals during power transmission such that any displacement of the power receiver is detectable. Where appropriate, ongoing selection of a wireless power outlet (hotspot) before and during wireless power transfer may be achieved by analyzing the associated detected communication signals communicated by the power receiver. Signal analyses may use signal-to-noise (SNR) ratio analysis to determine the signal-quality, for example. Additionally or alternatively, a Fast Fourier Transform (FFT) may be applied to the detected signals such that frequency filtering may be applied to the transformed detected communication signals to filter for known communication signal frequencies.

It is noted that in contradistinction to known detection methods which are generally based on power detection analysis, the current disclosure offers a different approach based upon measuring signal-quality of the detected communication signals, perhaps using, for example, signal-to-noise ratio. Additionally or alternatively, the approach of the disclosure may measure the quality of received signals in the data-over-coil (DOC) communication signal.

It is further noted that the current approach avoids the need of knowing coil specific parameters or technical structure. Further, coil-array related information, such as topology, overlapping or defining a specific coil-array configuration, may also be avoided, rather requiring only fine-tuning of SNR thresholds per specific product. Accordingly, power related computations may be minimal or not required.

Additionally or alternatively, the method may use passive sensing, independently analyzing on-going DOC signals, without interfering with other coils, thus allowing for enabling activation of an additional transmitter, before shutting down the active power transmitter coil (Tx), (so called 'make-before-break' functionality) thus allowing continuity of power transfer while in movement.

Furthermore, the method may enable more than one power transmitter coil (Tx) to be active in parallel. This may allow more than one power receiver coil (Rx) to power simultaneously.

Accordingly, the current system may be configured to support swapping of power transmitter coils, while continuously providing power wirelessly. Where appropriate, the current system may be operable to select multiple wireless power outlets, activate each of the selected multiple wireless power outlets to allow wireless power transfer and deactivate to stop wireless power transfer.

Where appropriate, the multi-outlet power transmission surface, providing wireless power transfer services may be distributed in public spaces such as restaurants, coffee shops, airport lounges, trains, buses, taxis, sports stadia, auditoria, theatres, cinemas or the like. Further, each wireless power outlet of the multi-outlet power transmission surface may be controlled and managed centrally. Accordingly, the network functioning of each outlet unit in the network, is required.

Tx-Rx Communication:

Each electrical device may have a unique identifier, which may be referred to as a receiver identification (RxID), in the system that allows the recognition thereof. The RxID may be a MAC address. The management server may store user or electrical device related information in addition to the RxID, such as power transfer related data, billing information, user credits or the like.

Where appropriate, wireless power outlets may have a unique identifier, which may be referred to as a transmitter identification (TxID), in the system that allows the recognition thereof.

For illustrative purposes only, possible methods for providing access to power for electrical devices in public spaces are presented hereinafter. The method may allow a user to transfer power or charge an electrical device such as a mobile phone, a tablet or the like from a wireless power outlet and may further allow a power provider to manage the power transfer, while gathering power transfer related information.

A user may place or connect an electrical device to a wireless power outlet. For example an inductively enabled device may be placed upon a wireless power outlet. Alternatively, or additionally, a power supply may be conductively connected to an electrical device.

The wireless power outlet may detect the electrical device connection. For example, wired connection may be detected by detecting the load and wireless connection may be detected using various remote sensors such as hall sensors, analog ping schemes or the like.

Audio Communication:

In one particular embodiment, the close communication channel between the device and power access point may be based upon audio signals sensed via a microphone of the electrical device, for example using specific audible bands, between 20 hertz and 20 kilohertz, or between 300 hertz and 20 kilohertz, say or the like. The audio signal may be emitted from an audio emitter such as a speaker or the like associated with the wireless power outlet. Many electrical devices, such as mobile phones and the like have microphone and software applications may have access to the microphone.

It is noted that powering the microphone unit may itself demand power. Consequently, the software application running on the electrical device may activate the microphone only where 'a-charge-connect' event is detected in the system. Accordingly, upon device detection the wireless power outlet may provide an initial power transfer to power the microphone. After a short interval, an identification signal may be sent via the audio signal.

The audio signal may include additional tones that are not related to the communication pattern which may mask the random patterns communicated. For example, an audio identification signal may be masked by a connection tone serving to provide users with an indication that a connection has been made.

Data-Over-Coil (DOC) Communication:

Alternatively or additionally, the close communication channel may be provided by the wireless power outlet alternating the activation of power transfer to the electrical device. The alternation of power supply is detected by most electrical devices as power transfer connection and disconnection events that are communicated to the application layer on these electrical devices.

The switching pattern may be coded with an identification signal such as the random pattern. The wireless power outlet may need to perform this switching in intervals spaced sufficiently apart to allow the electrical devices to detect and report to application level power transfer connection and disconnection events.

Bluetooth and NFC:

Still other embodiments may use Bluetooth or Near Field Communication (NFC) to achieve the close communication channel. These could be combined with the basic power signal to trigger their activation thereby conserving power.

In various embodiments of this system the LAN/WAN interface of the device may be WLAN or Cellular 2G/3G/4G connections. The connection to the WLAN or Cellular access point may also include manual or automatic insertion of user credentials. In this case the information may be conveyed to the management server to enable user identification. The information provided in order to allow access may also be stored by the device application and later provided directly to the management server.

Additionally, or alternately the LAN/WAN connection of the wireless power outlet may be achieved via the charged device. The wireless power outlet may encrypt messages to the management server and deliver this to the application on the electrical device via the close communication channel therebetween. The application may then send the message to the server via its LAN/WAN connection.

Communication Signal-Quality:

Wireless data transmission, for example, technology based on radio waves, may be sensitive to obstacles and interference which are considered as background noise. The background noise may provide indication of signal quality of a transmission between two devices, such as a secondary coil associated with power receiver and a primary coil associated with a wireless power outlet. The reception of the signal decreases with distance indicating low signal quality, enabling detection of the closest wireless power outlet of the surface to the power receiver. For example, signal-to-nose-ratio, often written S/N or SNR, provides a method to determine signal-quality, in analog and digital communications. The signal-to-noise ratio is a measure of signal strength relative to background noise, which is the unwanted signal. The ratio is usually measured in decibels (dB).

The current disclosure of selecting the closest wireless power outlet of a multi-outlet power transmission surface, uses two different sub-systems operable continuously and independently: a power transmission system to provide wireless power transfer and a signal processing unit comprises possibly a signal receiver and a processing unit, optionally combined with frequency filters, to measure the quality of the signal, for example, by obtaining SNR and determining the quality of the DOC. Accordingly, the DOC is a signal like any RxID message, as described hereinafter.

For example, the determination of the proximity of a wireless power outlet, having a power transmitter coil (Tx), to a power receiver coil (Rx) connectable to a load, may use signal processing. Thus, the sensing process, receiving and processing of multiple communication signals simultaneously, may be performed in parallel to wireless power transfer. The secondary coil associated with the power receiver, may act as a transmitter, transmitting a series of communication signals of data-over-coil (DOC) which are detected by a set of wireless power outlets of a multi-outlet power transmission surface. Where appropriate, each primary coil of the wireless power outlet may act as a receiver having an independent sensing unit and a driver operable to generate the powering control signal.

The transmitted communication signal, at a frequency such as 500 hertz, 2 kilohertz, 4 kilohertz and the like, may have three dimensional wave characteristics. Ideally, the transmitted signal advances directly at a steady frequency, with constant amplitude keeping the three dimensional perspective. In practice, the received communication signal profile may deviate from the transmitted signal profile as power may reduce over time, the medium may shift the frequency to some extent and the signal's phase may be rotated. This level of distortion is generally noise dependent.

The signal-quality analysis of the received communication signal may apply various parameters such as the amplitude, frequency, phase rotation or the like to assign a quality value to the communication signal. The closer the profile of the received signal to the profile of the transmitted signal, the higher the quality value, indicating a better signal-quality, in correlation to the distance between centers of the secondary coil to the primary inductive coil at test.

Accordingly, if signal-to-noise ratio is being applied, for example, each of these parameters or arguments may be detected by a sensor associated with each primary inductive coil to provide a signal-quality represented by an SNR value for comparison. The primary inductive coil with best SNR value relative to all other primary inductive coils, indicates the shortest distance between the power receiver and the wireless power outlet, which may then be selected and driven to provide power.

It is noted that the analysis may use the Fast Fourier Transform (FFT) filtering algorithm, to allow only DOC frequencies through.

It is further noted that the level of distortion of the communication signal may be computed by comparing the received communication signal profile to the original transmitted profile, known and defined by its communication protocol.

It is also noted that the architecture of the signal transfer system described hereinafter, each primary inductive coil may have its own sensing unit and may further use a signal receiver.

DESCRIPTION OF THE EMBODIMENTS

Reference is now made to FIG. 1 showing a block diagram of the main elements of an inductive power coupling 200 incorporating a signal transfer system 100 according to a first embodiment of the invention;

The inductive power coupling 200 consists of a primary inductive coil 220 and a secondary inductive coil 260. The primary coil 220 is wired to a power supply 240 typically via a driver 230 which provides the electronics necessary to drive the primary coil 220. Driving electronics may include a switching unit providing a high frequency oscillating voltage supply, for example. The secondary coil 260 is wired to an electric load 280.

When the secondary coil 260 is brought into proximity with the primary coil 220, the pair of coils forms an inductive couple and power is transferred from the primary coil 220 to the secondary coil 260. In this way a power outlet 210 may provide power to an electric device 290.

The signal transfer system 100 comprises: a signal generator 120, for generating a control signal $S_C$; a transmitter 140 for transmitting said control signal $S_C$; and a receiver 160 for receiving said control signal $S_C$.

Although in the signal transfer system 100 described herein, the transmitter 140 is incorporated into the power outlet 210 and the receiver 160 is incorporated into the electrical device 290, it will be appreciated that a transmitter 140 may alternatively or additionally be incorporated into the electrical device 290 and a receiver 160 may alternatively or additionally be incorporated into the power outlet 210.

The control signal $S_C$ communicates encoded data pertaining to the power transmission. This data may be pertinent to regulating efficient power transmission. Examples of such data includes parameters such as: required operating voltage, current, temperature or power for the electric load 280, the measured voltage, current, temperature or power supplied to the electric load 280 during operation, the measured voltage, current, temperature or power received by the electric load 280 during operation and the like.

In other embodiments, the control signal $S_C$ may communicate data relating to the coordinates of the primary inductive coil 220 for the purposes of indicating the location of the power outlet 210. Alternatively, the control signal $S_C$ may communicate data relating to the identity or presence of the electric load 280 such as the location of the secondary coil 260, or an identification code or the electric device 290 or its user.

Various transmitters 140 and receivers 160 may be used with the signal transfer system. Where the primary and secondary coils 220, 260 are galvanically isolated for example, optocouplers may have a light emitting diode serving as a transmitter 140 which sends encoded optical signals over short distances to a phototransistor which serves as a receiver 160. Optocouplers typically need to be aligned such that there is a line-of-sight between transmitter and receiver. In systems where alignment between the transmitter 140 and receiver 160 may be problematic, optocoupling may be inappropriate and alternative systems may be preferred such as ultrasonic signals transmitted by piezoelectric elements or radio signals such as Bluetooth, WiFi and the like. Alternatively the primary and secondary coils 220, 260 may themselves serve as the transmitter 140 and receiver 160.

Coil-to-Coil Signal Transfer:

One aspect of the present embodiments relate to a signal transfer system for transferring a transmission signal regarding an electric load connectable via an inductive energy coupling to a power source. The inductive energy coupling comprises a primary coil connectable to the power source in inductive alignment with a secondary coil connectable to the electric load, the system comprises at least one ancillary load; at least one switching unit comprising a modulator for modulating a bit-rate signal with an input signal to create a modulated signal and a switch for intermittently connecting the ancillary load to the secondary coil according to the modulated signal; at least one current monitor for monitoring primary current drawn by the primary coil and producing a primary current signal, and at least one correlator for cross-correlating the primary current signal with the bit-rate signal for producing an output signal.

The switching unit preferably also comprises a controller configured to encode data into the input signal. Typically, the switching unit further comprises a frequency divider and the inductive energy coupling transfers energy with a driving frequency and the bit rate frequency is an integer fraction of the driving frequency.

The inductive energy coupling is typically a device wherein the primary coil is galvanically isolated from said secondary coil. The device may include a transformer, a DC-to-DC converter, an AC-to-DC converter, an AC-to-AC converter, a flyback transformer, a flyback converter, a full-bridge converter, a half-bridge converter, a buck converter, a boost converter, a buck-boost converter, a SEPIC converter or a zeta converter, for example.

Optionally, the input signal carries encoded data pertaining to, for example, the presence of the electric load, required operating voltage for the electric load, required operating current for the electric load, required operating temperature for the electric load, measured operating voltage for the electric load, measured operating current for the electric load, measured operating temperature for the electric load, and/or a user identification code.

In one embodiment, a contactless inductive coupling is provided, comprising the signal transfer system wherein the primary coil is embedded in a power jack and the secondary coil is embedded in a power plug galvanically isolated from the power jack.

An aspect of the technology described herein, teaches a method for transferring a signal through an inductive energy coupling, wherein the inductive energy coupling comprises a primary coil connected to a power source and a secondary coil connected to an electric load, the method comprising the following steps: providing an input signal, providing a bit-rate signal, modulating the bit-rate signal with the input signal to create a modulated signal, connecting an ancillary load to the secondary coil intermittently according to the modulated signal, monitoring a primary current drawn by the primary coil and producing a primary current signal; and cross-correlating the primary current signal with the bit-rate signal to generate an output signal.

According to another aspect, a method for regulating power transfer across a contactless inductive coupling is taught wherein the output signal provides details of power requirements of the load. Typically the input signal is provided by encoding data regarding at least one power requirement of the electric load into the input signal. Optionally and typically, the power requirement depends on parameters such as operating voltage, operating current and/or operating temperature. Alternatively the input signal is provided by monitoring at least one operating parameter of the electric load and encoding monitored parameter data into the input signal. Optionally the parameter is selected from the group comprising operating voltage, operating current and operating temperature. Typically the method for transferring a signal through an inductive energy coupling includes a preliminary step of detecting the presence of an electric load.

Reference is now made to FIGS. 2A-D wherein a signal transfer system 2100A according to a second general embodiment of the invention is shown.

Figure 2A:
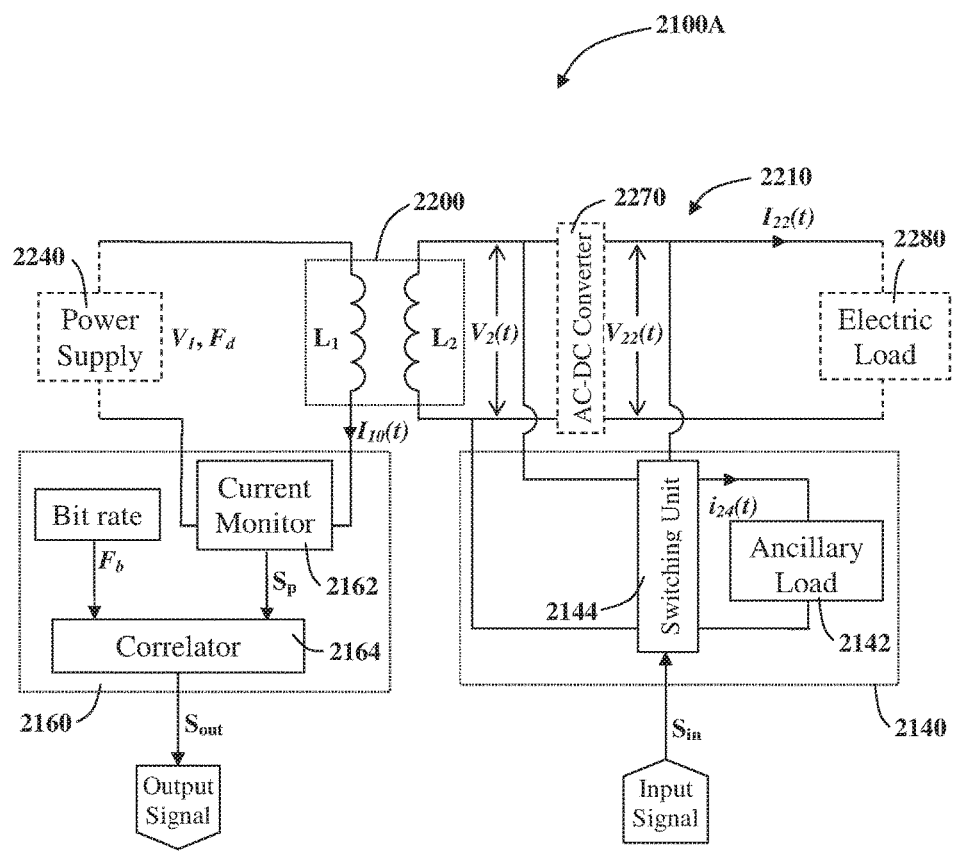
FIG. 2A-D show another embodiment of the signal transfer system in which a control signal is transmitted through an inductive energy coupling.

With particular reference to FIG. 2A, the signal transfer system 2100A is configured to transmit a transmission signal through an inductive energy coupling 2200. The inductive energy coupling 2200 consists of a primary coil $L_1$ which may be connected to a power source 2240 and a secondary coil $L_2$, galvanically isolated therefrom, across which an electric load 2280 may be connected either directly or via an AC-DC converter 2270.

A transmission circuit 2140 may be connected in parallel with the electric load 2280. The transmission circuit 2140 comprises an ancillary load 2142 connected to the secondary coil $L_2$ via a switching unit 2144. Typically the ancillary load 2142 is much smaller than the electric load 2280.

A corresponding reception circuit 2160 is connected to the primary coil $L_1$ of the inductive energy coupling 2200 and comprises a current monitor 2162, such as an ammeter in series with the primary coil $L_1$, and a correlator 2164.

The switching unit 2144 is configured to receive an input signal $S_{in}$ and a bit-rate signal $F_b$. A modulator (not shown) modulates the bit-rate signal $F_b$ with the input signal $S_{in}$ to produce a modulated signal $S_M$. The ancillary load 2142 is intermittently connected to the secondary coil $L_2$ at a rate determined by the modulated signal $S_M$.

The power source 2240, such as an alternating-current voltage source, intermittent direct current voltage source or the like, is configured and operable to produce a primary voltage $V_1$ which oscillates at a driving frequency $F_d$. The oscillating primary voltage $V_1$ in coil $L_1$ induces a secondary voltage $V_2(t)$ in the secondary coil $L_2$. The secondary voltage $V_2(t)$ is optionally passed through an AC-DC converter 22 producing a direct-current voltage $V_{22}(t)$.

The electric load 2280 which is coupled to the secondary coil $L_2$—either directly or via the AC-DC converter 2270—draws a load current $I_{22}$. The power $P_{22}$ provided to the load 2280 is given by the scalar product of the voltage $V_{22}$ and the load current $I_{22}$. When the ancillary load 2144 is connected, an additional ancillary current $i_{24}$ is also drawn. Thus, with the ancillary load 2144 connected, the total power $P_2$ drawn by the secondary coil $L_2$ is given by:

$$P_2(t) = \vec{V}_{22}(t) \cdot [\vec{I}_{22} + \vec{i}_{24}(t)]$$

where the ancillary current signal $i_{24}(t)$ varies with the modulated signal $S_M$.

The input power $P_1(t)$ provided to the primary coil $L_1$ is given by:

$$P_1(t) = \vec{V}_1(t) \cdot \vec{I}_{10}(t)$$

where the primary voltage $V_1(t)$ oscillates at the driving frequency $F_d$ which is determined by the power supply 2240.

Input power $P_1(t)$ provided by the primary coil $L_1$ is generally proportional to the total power $P_{22}(t)$ drawn by the secondary coil $L_2$, and the primary voltage $V_1(t)$ is determined by the power supply. Perturbations in the primary current $I_{10}(t)$ supplied to the primary coil $L_1$ are thus in proportion with $i_{24}(t)$.

The current monitor 2162 monitors the primary current $I_{10}(t)$ over time, producing a primary current signal $S_p$ which typically has similar characteristics to the modulated signal $S_M$. The correlator 2164 is configured to cross-correlate the primary current signal $S_p$ with the bit rate $F_b$. The output signal $S_{out}$ of the correlator 2164 therefore has the same characteristics as the input signal $S_{in}$.

In this manner, information carried by the input signal $S_{in}$ is transmitted from the transmission circuit 2140 and is retrievable by the receiver circuit 2160 from the output signal $S_{out}$. It is noted that the signal transfer system 2100A described herein, transmits a transmission signal across the same inductive power coupling 2200 as used for power transmission. This is in contradistinction to prior art transmission systems, which use additional elements to provide signal transmission channels separate from the power transmission channels. In consequence of this innovative approach, additional transmission elements such as optocouplers, piezoelectric elements, supplementary coil pairs and the like are not generally required.

Figure 2B:
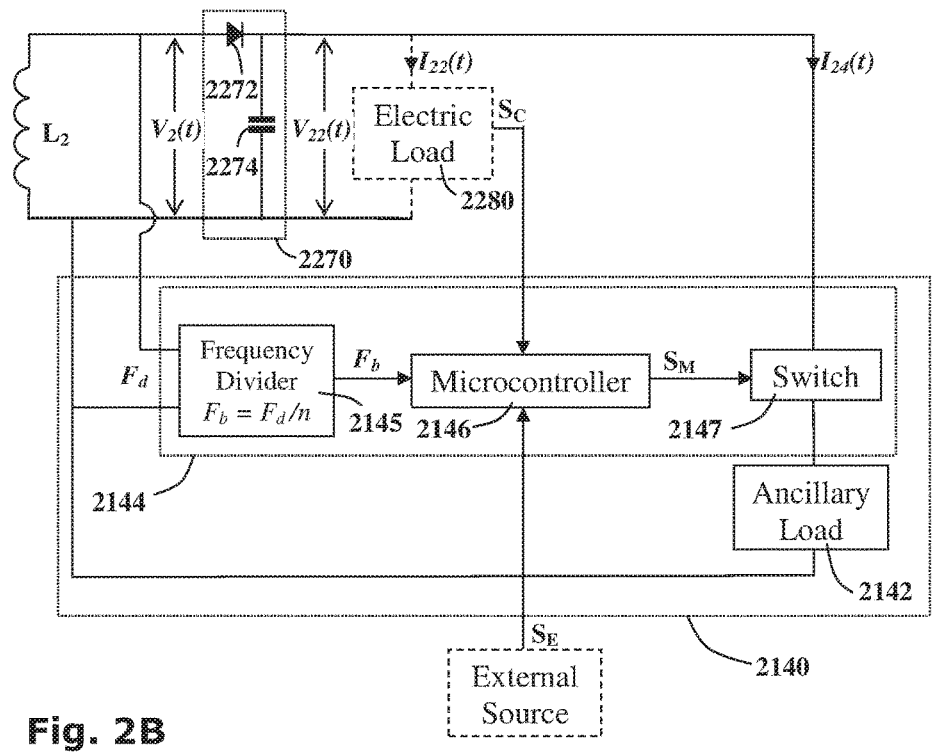

With reference now to FIG. 2B, an exemplary transmission circuit 2140 of the signal transfer system 2100A of FIG.

2A is shown. An AC-to-DC converter 2270 comprising a diode 2272 and a capacitor 2274, which is connected in parallel to the secondary coil $L_2$, converts an AC secondary voltage $V_2$ from the secondary coil $L_2$ into a DC load voltage $V_{22}$ which is connected across an electric load 2280.

The connection between the ancillary load 2142 and the load voltage $V_2$ is controlled by a switching unit 2144 which includes a frequency divider 2145, microcontroller 2146 and a switch 2147. The frequency divider 2145 provides the bit-rate signal $F_b$ which is passed to the microcontroller 2146. The microcontroller 2146 is configured to modulate the bit-rate signal $F_b$ according to input signals including control signals $S_C$ from the electric load 2280 and external signals $S_E$. as described hereinafter.

Control signals $S_C$ may be used to regulate the power supply. Control signals $S_C$ typically provide data relating to load parameters. Typically these include the required operating voltage, current and temperature and the actual measured operating voltage, current and temperature as monitored during operation of the load.

External Signals $S_E$ may be used to provide the transmission circuit 2140 with external data to be digitally encoded into the input signal $S_{in}$ by the microcontroller 2146 and transmitted to the receiver circuit 2160. External information, may, for example, provide useful supplementary data such as a user identification code, a pass key, battery level of the load device and the like.

It will be appreciated that the ability to transmit supplementary information such as external signals $S_E$ through the inductive energy coupling 2200 presents a further advantage over prior art systems which are only suitable for transmitting control signals.

Figure 2C:
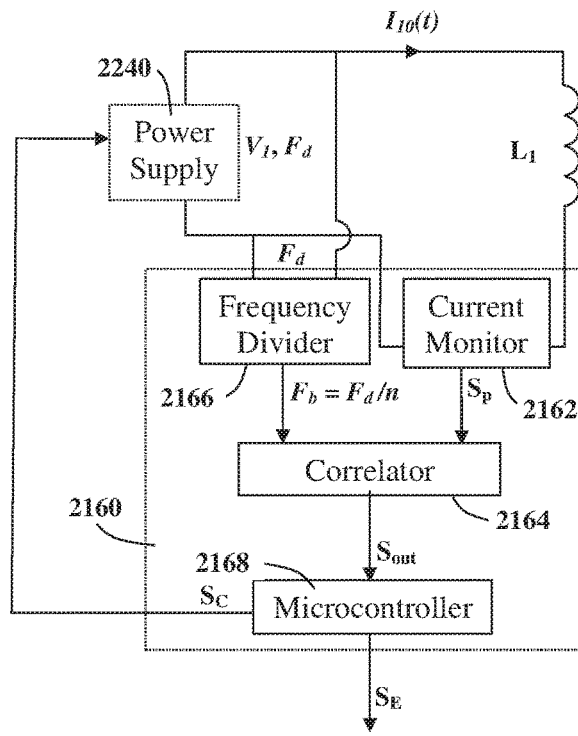

With reference now to FIG. 2C, a schematic representation of an exemplary receiver circuit 2160 is shown, in accordance with the signal transfer system 2100A of FIG. 2A, consisting of a current monitor 2162, a frequency divider 2166, a correlator 2164 and a microcontroller 2168. The frequency divider 2166 provides the bit-rate signal $F_b$ which is typically an integer fraction of the driving frequency $F_d$. The current monitor 2162 provides a primary current signal $S_P$ which is passed to the correlator 2164 for cross-correlation with the bit-rate signal $F_b$. The resulting output signal $S_{out}$ is passed to a microcontroller 2168 which may use the output signal $S_{out}$ to pass a control signal Sc to control the power source 2240 so as to regulate the power provided to the electric load 2280. The microcontroller 2168 may also be used to extract external signals $S_E$ from the output signal.

Figure 2D:
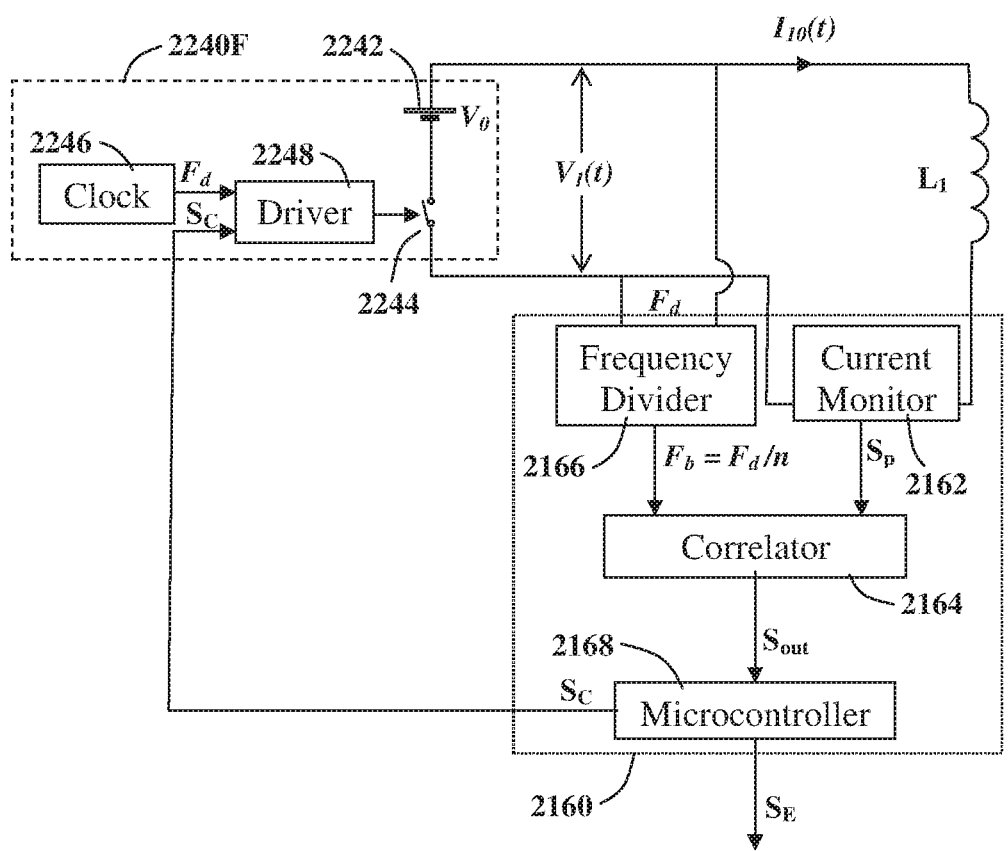

With reference now to FIG. 2D, an exemplary use of the receiver circuit 2160 is highlighted, in accordance with the signal transfer system 2100A of FIG. 2A, which shows the receiver circuit 2160 configured to control a flyback power source 2240F. In a flyback converter, a direct current voltage source 2242 is intermittently connected to a primary coil $L_1$ by a switch 2244. This produces a varying voltage signal $V_1(t)$ in the primary coil $L_1$ which induces a secondary voltage $V_2$ in a secondary coil $L_2$ (FIG. 2A). The secondary coil $L_2$ is generally connected to a smoothing circuit such the AC-DC converter 2270 shown in FIG. 2B to produce a DC output.

The switch 2244 is controlled by a driver 2248 which receives a pulsing signal $F_d$ from a clock 2246. The pulsing signal $F_d$ determines the frequency with which the direct current voltage source 2242 is connected to the primary coil $L_1$. The power delivered to the primary coil $L_1$ may be regulated by varying the duty cycle of the switch 2244. The duty cycle is the proportion of the time between pulses during which the switch 2244 is closed.

Further, FIG. 2D shows the innovative use of the signal transfer system 2100A of FIG. 2A which receives a feedback signal transferred between the primary and secondary power transmission coils and received by the receiver circuit 2160. This is an improvement on prior art flyback converters, wherein additional elements such as optocouplers or the like have been used to transmit feedback signals.

The microcontroller 2168 generates a control signal $S_C$ which is relayed to the driver 2248. The control signal $S_C$ determines the duty cycle of the switch 2248 and so may be used to regulate power transmission.

Although only a flyback converter is represented in FIG. 2D it is noted that a control signal $S_C$ thus transmitted may be used to regulate power transfer in a variety of transmission assemblies such as a transformer, a DC-to-DC converter, an AC-to-DC converter, an AC-to-AC converter, a flyback transformer, a full-bridge converter, a half-bridge converter or a forward converter for example.

Figure 3:
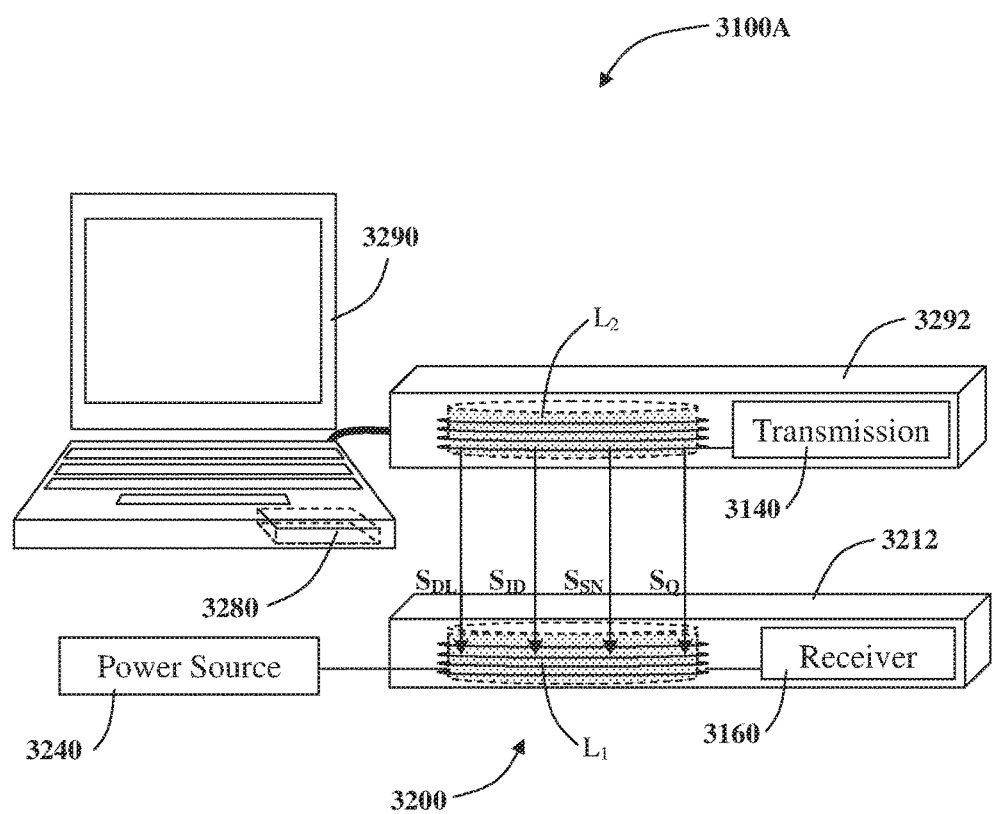
FIG. 3 is a schematic diagram showing a signal transfer system integrated into a contactless inductive power coupling system for powering a computer.

Reference is now made to FIG. 3, showing a schematic diagram example of the signal transfer system 100 of FIG. 1 inductively powering a portable computer. According to a third embodiment of the invention, a signal transfer system 3100A may be integrated into a contactless inductive power coupling system 3200 where power is inductively transmitted from a jack unit 3212 to a plug unit 3292 galvanically isolated therefrom. A transmission circuit 3140 embedded in the plug unit 3292 may be used to transmit control signals $S_C$ to a receiver circuit 3160 in the jack 3212. Thus once the primary $L_1$ and secondary $L_2$ coils are aligned, control signals may be passed between the plug 3292 and jack 3212 units with no need to align additional components such as optocouplers, and the like.

Where a contactless plug 3292 is used, for example to power a portable computer 3290 having on-board power cells 3280, the signal transfer system 3100A may be used to detect the presence of the electric load of the portable computer 3290 producing a detection signal $S_{DL}$ and then to provide the jack 3212 with signals relating to the identity of the user $S_{ID}$ and the serial number $S_{SN}$ or other identifier of the portable computer 3290. Signals regarding the operating voltage and current required by the PC may be provided as a regulatory signal $S_Q$ which may also provide supplementary information such as information related to the power level of the cells 3280, for example. Using this signal $S_Q$, the signal transfer system 3100A may be used to select between powering the portable computer 3290 directly, recharging the power cells 3280 thereof, or both powering and recharging, depending on defaults and predetermined criteria. It is further noted that when used for recharging cells 3280, the ability to monitor the temperature of the cells 3280 during recharging may be used to prevent overheating.

Figure 4:
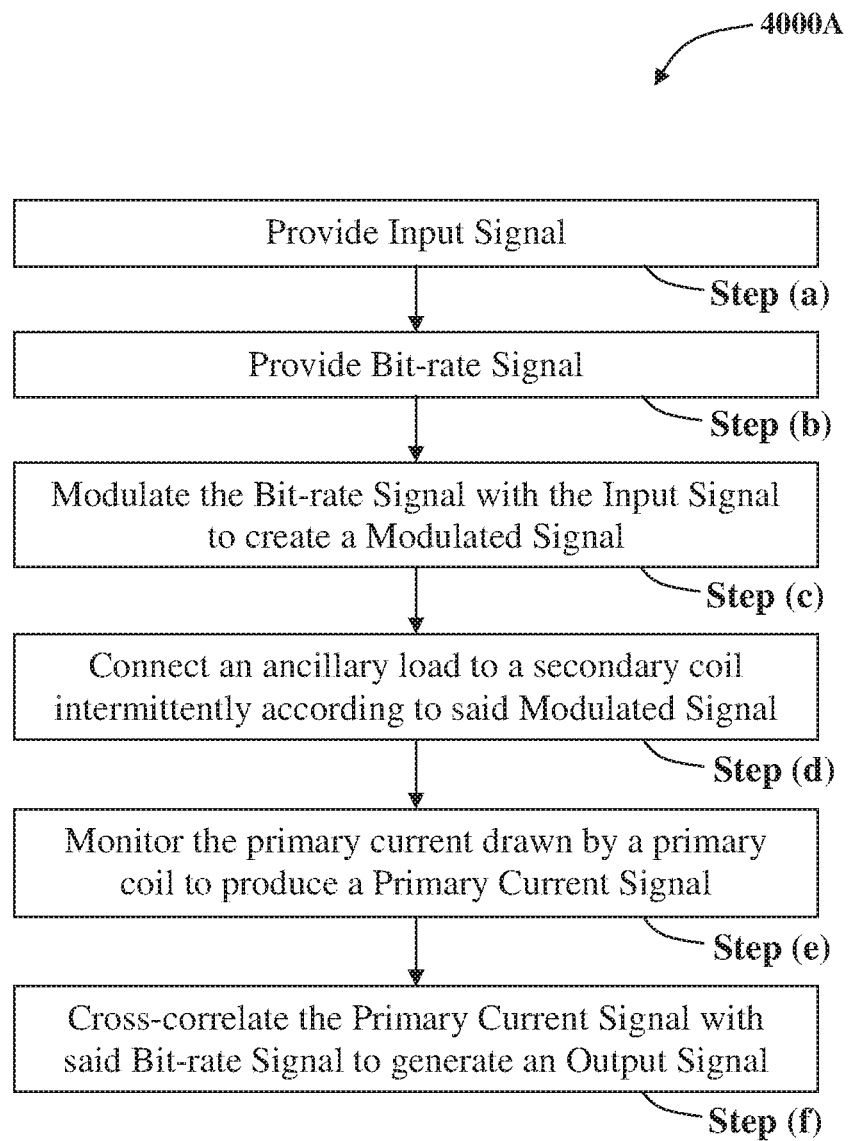
FIG. 4 is a flowchart showing a method for transferring a transmission signal through an inductive energy coupling in accordance with the invention.

Reference is now made to FIG. 4, a flowchart 4000A showing a method for transferring a transmission signal through an inductive energy coupling in accordance with another embodiment of the invention is presented. With further reference to FIG. 2A, an Input Signal $S_{in}$—Step (a) and a Bit-rate Signal $F_b$—Step (b) are provided to the transmission circuit 2140. The Bit-rate Signal $F_b$ is then modulated by the Input Signal $S_{in}$, producing a Modulated Signal $S_M$—Step (c). An ancillary load 2142 is then connected to the second coil $L_2$ intermittently according to the Modulated Signal $S_M$—Step (e). The receiver circuit 2160 monitors the primary current drawn by the primary coil $L_1$ to produce a Primary Current Signal $S_P$—Step (e). This Primary Current Signal $S_P$ is then cross-correlated with the Bit-rate Signal $F_b$ to generate an Output Signal $S_{out}$—Step (f).

The basic signal transfer system and method described hereinabove are capable of variation. For example, it will be appreciated that through the use of such a system, information regarding an electric load 2280 (FIG. 2A) may be transmitted to the power outlet 2210 (FIG. 2A) across the inductor coils $L_1$ and $L_2$ of the inductive coupling 2200 (FIG. 2A), as a signal superimposed on the power transmitted, without requiring additional data transmitting components.

Secondary Coil Locators:

The signal transfer system may be associated with the primary coil and used to detect the location of the secondary inductive coil. For example, in a power outlet surface comprising multiple primary coils, each primary coil may be independently connected to the power source via a driver. The signal transfer system may be used to identify the primary coil closest to the location of a secondary coil. Typically, the primary coils may be driven at multiple power levels, such that a low power level is used to locate the secondary coil and a higher power is used to transfer power when a secondary coil is located.

In preferred embodiments the secondary coil is wired to a transmission circuit comprising an ancillary load connectable to the secondary coil via a half-wave rectifier, such as a diode. The transmission circuit may also comprise a smoothing capacitor, a low power current source and a DC to DC converter.

When in detection mode, the driver activates each primary coil sequentially at low power. When a secondary coil is close enough to a primary coil to inductively couple with it, the low power pulse is transferred from the primary coil to the secondary coil. An AC voltage is induced in the secondary coil and the transmission circuit is activated. A DC current is produced by the half-wave rectifier and flows through the ancillary load.

A control signal is transmitted by the secondary coil due to the transmission circuit. Because half-wave rectification is used, even harmonics of the power transmission frequency are generated. These may be detected by a reception circuit connected to the primary coil, for example by cross-correlating the power transmission frequency with a reference clock frequency.

The strength of the even harmonic signals may indicate the proximity of the primary to the secondary coil. Once a secondary coil is detected, the driver may switch the closest primary coil to power transmission mode, typically at a higher power.

It will be appreciated that in applications where a main electric load is itself wired to the secondary coil via an AC-DC power converter which performs half-wave rectification, even harmonics are produced whenever the secondary coil is coupled to a primary coil, whether or not the ancillary load is connected. The strength and phase of both odd and even harmonics may be continuously monitored during power transmission so that if the secondary coil is displaced or removed it will be readily detected. Optionally the transmission circuit may be deactivated when power is provided to the electric load. Alternatively, where the main load is wired to the secondary coil via a half-wave rectifier, the ancillary load may be dispensed with entirely.

Figure 5:
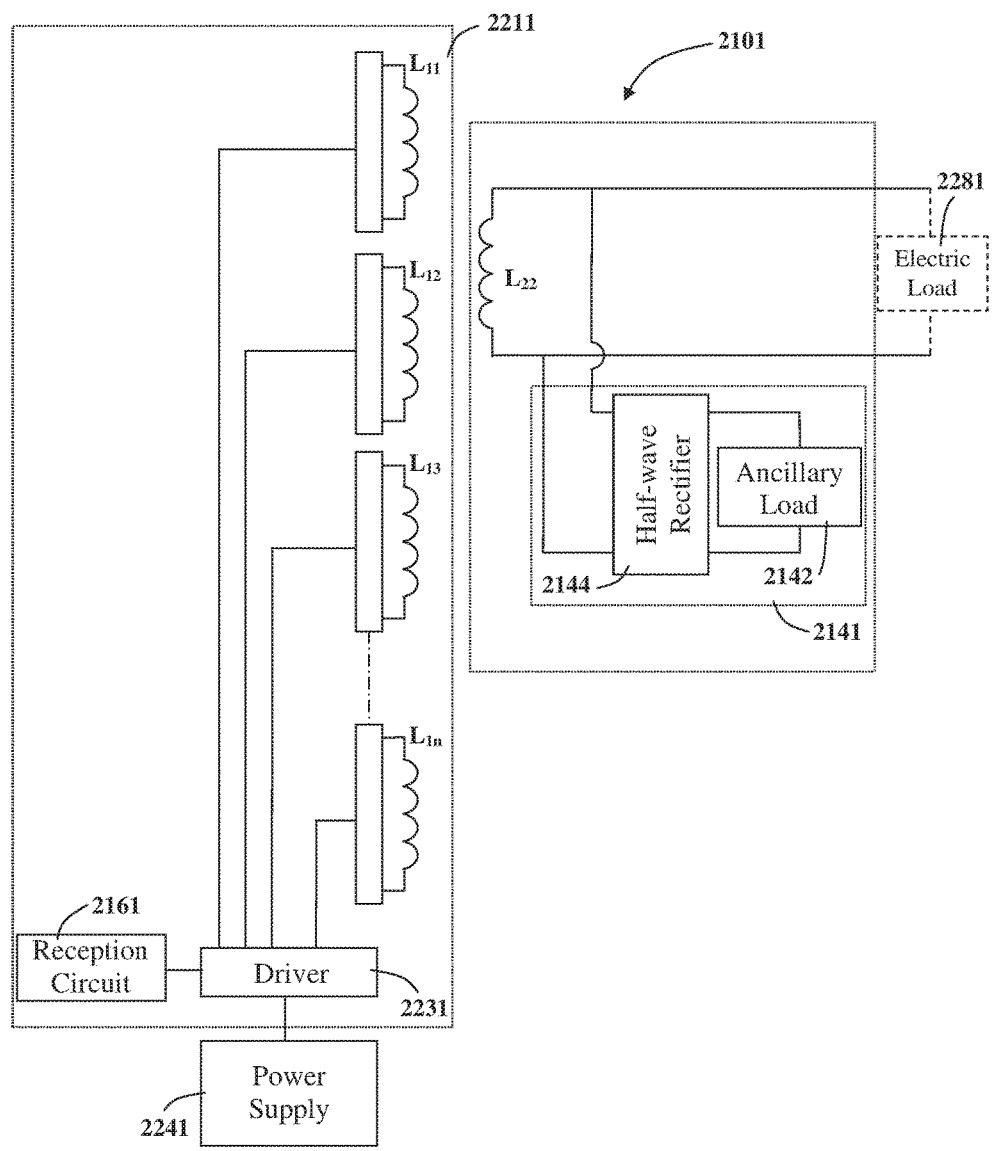
FIG. 5 is a schematic representation of a signal transfer system incorporated into a system for locating secondary coils placed upon a multi-coil power transmission surface.

Reference is now made to FIG. 5 showing a signal transfer system 2101 according to yet another embodiment of the invention. The signal transfer system 2101 is used for locating a secondary coil $L_{22}$ wired to an electric load 2281, which is placed somewhere over a multi-coil power transmission surface 2211.

The multi-coil power transmission surface 2211 comprises an array of primary coils $L_{1n}$ each connected to a driver 2231 wired to a power source 2241. The signal transfer system 2101 includes a transmission circuit 2141 wired to the secondary coil 2221 and a reception circuit 2161 connected to the driver 2231. The transmission circuit 2141 includes a half-wave rectifier 2144 connected to an ancillary load 2142 and the reception circuit 2161 is configured to detect second harmonic signals in the power supplied to the primary inductive coil $L_{1n}$ when the secondary inductive coil $L_{22}$ is coupled thereto.

The driver 2231 is configured to selectively operate each primary inductive coil $L_{1n}$ in turn preferably at low power so as to identify which primary inductive coil is closest to the secondary inductive coil $L_{22}$. When a secondary coil $L_{22}$ is detected, the driver 2231 is then configured to operate the primary inductive coil $L_{1n}$ closest to the secondary inductive coil $L_{22}$ at a high power. It will be appreciated that for some purposes it may be desirable to disconnect the transmission circuit 2141 after the secondary inductive coil $L_{22}$ is coupled to a primary coil $L_{1n}$.

Thus a number of related technologies are presented that use signal transfer systems across an inductive power coupling to regulate the power and to detect and align the two coils.

Figure 6:
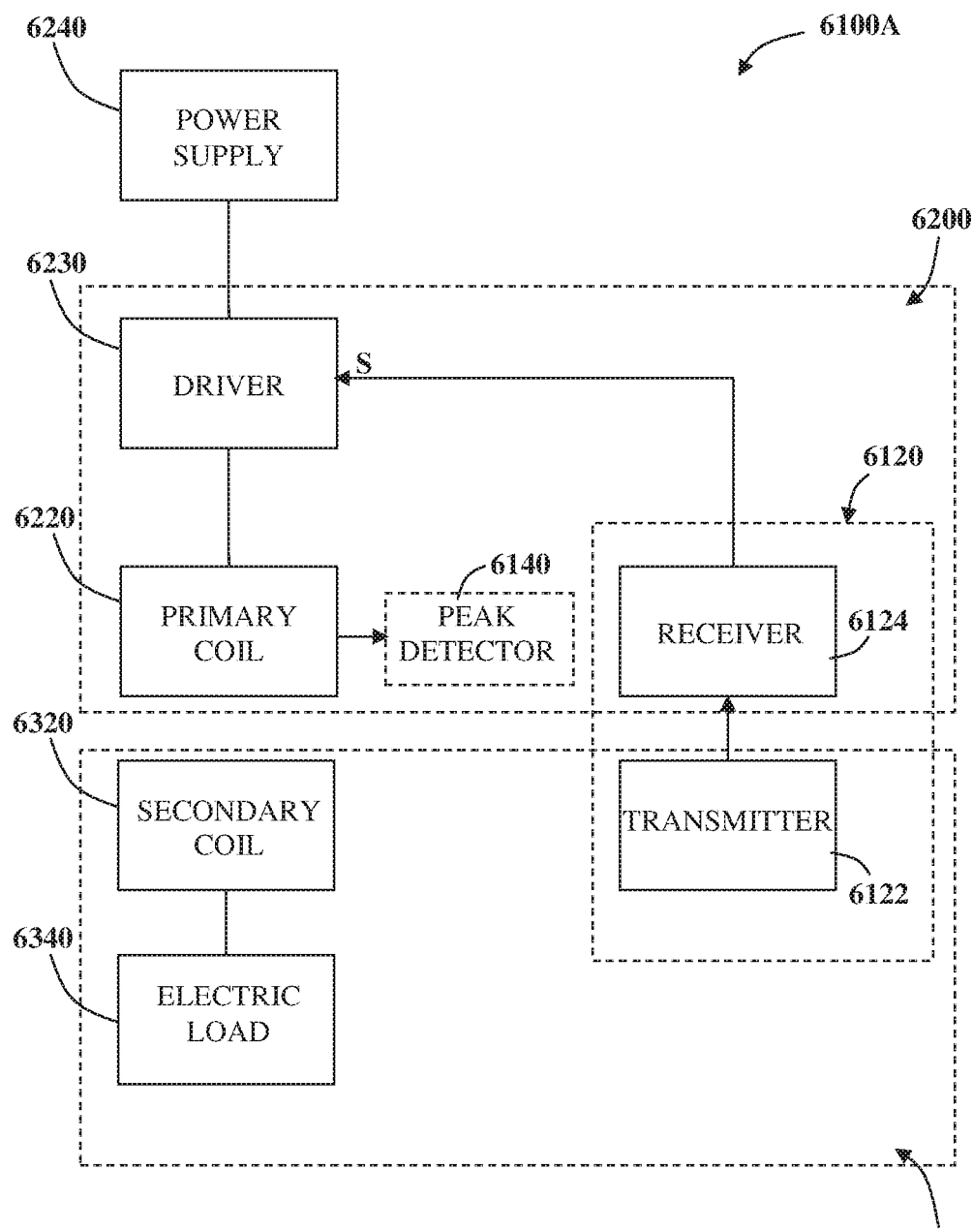
FIG. 6 is a block diagram showing the main elements of an inductive power transfer system with a feedback signal path according to embodiments of the present invention.

Reference is now made to FIG. 6 showing a block diagram of the main elements of an inductive power transfer system 6100A adapted to transmit power at a non-resonant frequency according to another embodiment of the invention. The inductive power transfer system 6100A consists of an inductive power outlet 6200 configured to provide power to a remote secondary unit 6300. The inductive power outlet 6200 includes a primary inductive coil 6220 wired to a power source 6240 via a driver 6230. The driver 6230 is configured to provide an oscillating driving voltage to the primary inductive coil 6220.

The secondary unit 6300 includes a secondary inductive coil 6320, wired to an electric load 6340, which is inductively coupled to the primary inductive coil 6220. The electric load 6340 draws power from the power source 6240. An inductive communication channel 6120 may be provided between a transmitter 6122 associated with the secondary unit 6300 and a receiver 6124 associated with the inductive power outlet 6200. The inductive communication channel 6120 may provide feedback signals S and the like to the driver 6230.

In some embodiments, a voltage peak detector 6140 is provided to detect large increases in the transmission voltage. As will be descried below the peak detector 6140 may be used to detect irregularities such as the removal of the secondary unit 6200, the introduction of power drains, short circuits or the like.

Figure 7:
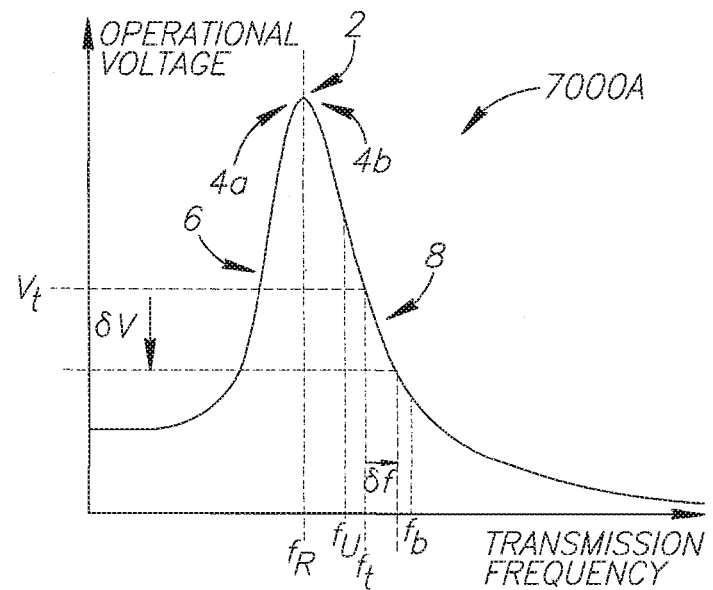
FIG. 7 is a graph showing how the amplitude of operational voltage of an inductive power transfer system varies with transmission frequency.

Reference is now made to FIG. 7, a graph showing how the amplitude of the operational voltage of an inductive power transfer system varies according to the transmission frequency. It is noted that the voltage is at its highest when the transmission frequency is equal to the resonant frequency $f_R$ of the system, this maximum amplitude is known as the resonance peak 2. It is further noted that the slope of the graph is steepest in the regions 4a, 4b to either side of the resonance peak 2. Thus in inductive transfer systems, which operate at or around resonance, a small variation in frequency results in a large change in induced voltage. Similarly, a small change in the resonant frequency of the system results in a large change in the induced voltage. For this reason prior art resonant inductive transfer systems are typically very sensitive to small fluctuations in environmental conditions or variations in alignment between the induction coils.

It is a particular feature of embodiments of the current invention that the driver 6230 (FIG. 6) is configured and operable to transmit a driving voltage which oscillates at a transmission frequency which is substantially different from the resonant frequency of the inductive couple. Optionally the transmission frequency is selected to lie within one of the near-linear regions 6, 8 where the slope of the frequency-amplitude graph is less steep.

Figure 8:
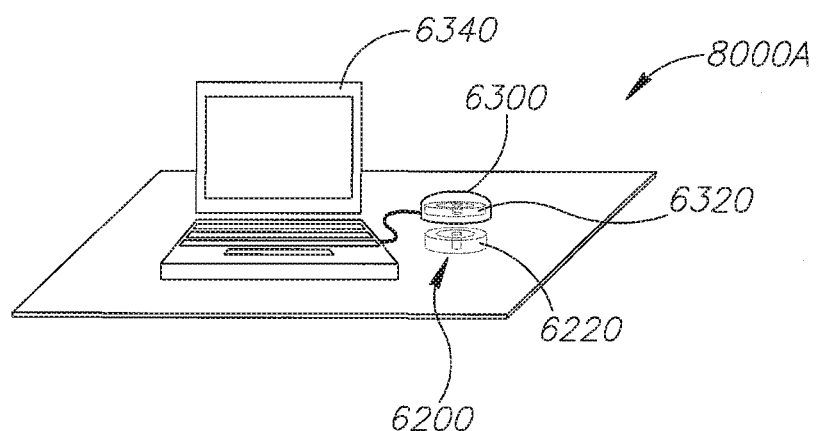
FIG. 8 is a schematic diagram representing a laptop computer drawing power from an inductive power outlet.

One advantage of this embodiment of the present invention may be demonstrated with reference now to FIG. 8. A schematic diagram 8000A is shown representing a portable computer 6340 (the electric load) drawing power from an inductive power outlet 6200 via a secondary power receiving unit 6300. The power receiving unit 6300 includes a secondary inductive coil 6320 which is aligned to a primary inductive coil 6220 in the inductive power outlet 6200. Any lateral displacement of the secondary power receiving unit 6300 changes the alignment between the secondary inductive coil 6320 to the primary inductive coil 6220. As a result of the changing alignment, the combined inductance of the coil pair changes which in turn changes the resonant frequency of the system.

If the inductive power outlet 6200 transmits power at the resonant frequency of the system, even a small lateral movement would reduce significantly the amplitude of the induced voltage. In contradistinction to the prior art, in embodiments of the present invention the inductive power outlet 6200 transmits power at a frequency in one of the regions 6, 8 to either side of the resonance peak 2 (FIG. 7) where the slope of the resonance graph is much shallower. Consequently, the system has a much larger tolerance of variations such as lateral movement.

A further feature of embodiments of inductive power outlets transmitting at frequencies above the natural resonant frequency of the system, is that if the resonant frequency of the system increases for some reasons, then the transmission voltage increases sharply. In preferred embodiments, a peak detector 6140 (FIG. 6) is be provided to monitor the transmission voltage of the power outlet 6200 and is configured to detect large increases in the transmission voltage indicating an increase in resonant frequency.

Referring again to the resonant formula for inductive systems, $$f_R = \frac{1}{2\pi\sqrt{LC}},$$

it is noted that any decrease in either the inductance L or the capacitance C of the system increases the resonant frequency and may be detected by the peak detector 6140 (FIG. 6).

As an example of the use of a peak detector 6140 (FIG. 6), reference is again made to FIG. 8. It will be appreciated that in a desktop environment, conductive bodies such as a paper clip, metal rule, the metal casing a stapler, a hole-punch or any metallic objects may be introduced between the inductive power outlet 6200 and the secondary power receiving unit 6300. The oscillating magnetic field produced by the primary coil 6220 would then produce eddy currents in the conductive body heating it and thereby draining power from the primary coil 6220. Such a power drain may be wasteful and/or dangerous. Power drains such as described above generally reduce the inductance L of the system thereby increasing its resonant frequency.

The inductance L of the system may also be reduced by the removal of the secondary coil 6320, the creation of a short circuit or the like. A peak detector 6140, wired to the inductive power outlet, may detect any of these scenarios as a large increase in transmission voltage. Where required, the power transfer system may be further configured to shut down, issue a warning or otherwise protect the user and the system in the event that the peak detector 6140 detects such an increase in transmission voltage.

Figure 9:
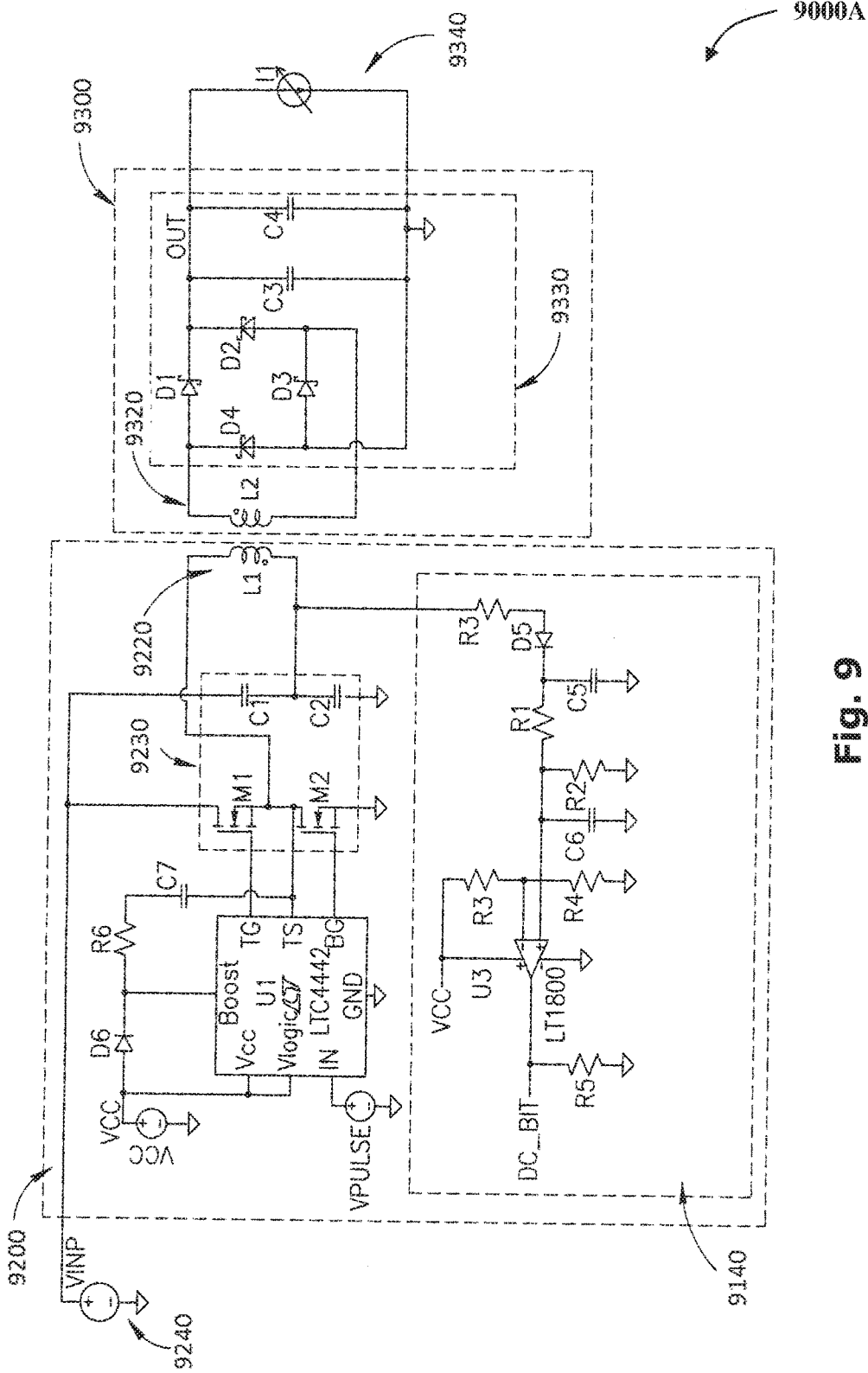
FIG. 9 is a circuit diagram of an inductive power transfer system according to another embodiment of the invention including a peak detector for detecting large increases in transmission voltage.

Reference is now made to FIG. 9, showing a circuit diagram 9000A of an inductive power transfer system according to another embodiment of the invention including a peak detector for detecting large increases in transmission voltage. The circuit diagram 9000A comprises an inductive power outlet 9200 and secondary unit 9300. The secondary unit 9300 comprises a secondary coil 9320 wired to an electric load 9340 via a rectifier 9330.

The inductive power outlet 9200 comprises a primary coil 9220 driven by a half-bridge converter 9230 connected to a power source 9240. The half-bridge converter 9230 is configured to drive the primary coil 9220 at a frequency higher than the resonant frequency of the system and a peak detector 9140 is configured to detect increases in the transmission voltage.

Although only a half-bridge converter is represented in FIG. 9, it is noted that other possible driving circuits include: a DC-to-DC converter, an AC-to-DC converter, an AC-to-AC converter, a flyback transformer, a full-bridge converter, a flyback converter or a forward converter for example.

Another advantage of non-resonant transmission is that the transmission frequency may be used to regulate power transfer. Prior art inductive power transfer systems, typically regulate power transfer by altering the duty cycle of the transmission voltage. Unlike prior art systems, because embodiments of the present invention transmit at a frequency not equal to the resonant frequency of the system, the driver 230 (FIG. 1) may be configured to regulate power transfer by adjusting the transmission frequency.

The regulation 7000A is illustrated with reference to FIG. 7. In embodiments of the invention, the frequency of transmission may be selected to be in the approximately linear region 8 of the curve between a lower frequency value of $f_L$ and an upper frequency value of $f_U$. A transmission frequency $f_t$, higher than the resonant frequency $f_R$ of the system, produces an induced voltage of $V_t$. The induced voltage can be increased by reducing the transmission frequency so that it is closer to the resonant frequency $f_R$. Conversely, the induced voltage may be reduced by increasing the transmission frequency so that it is further from the resonant frequency $f_R$. For example, an adjustment of transmission frequency by $\delta f$ produces a change in induced voltage of $\delta V$.

In some embodiments, such as illustrated in FIG. 6, an inductive communication channel 6120 is provided between the secondary unit 6300 and the inductive power outlet 6200. to communicate the required operating parameters. In embodiments of the invention operating parameters the inductive communication channel 6120 may be used to indicate the transmission frequency required by the electric load 6340 to the driver 6230.

The inductive communication channel 6120 may further provide a feedback signal during power transmission. The feedback transmission may communicate required or monitored operating parameters of the electric load 6340 such as:
- required operating voltage, current, temperature or power for the electric load 6340,
- the measured voltage, current, temperature or power supplied to the electric load 6340 during operation,
- the measured voltage, current, temperature or power received by the electric load 6340 during operation and the like.

In some embodiments, a microcontroller in the driver 6230 may use such feedback parameters to calculate the required transmission frequency and to adjust the driver accordingly. Alternatively, simple feedback signals may be provided indicating whether more or less power is required.

Figure 10:
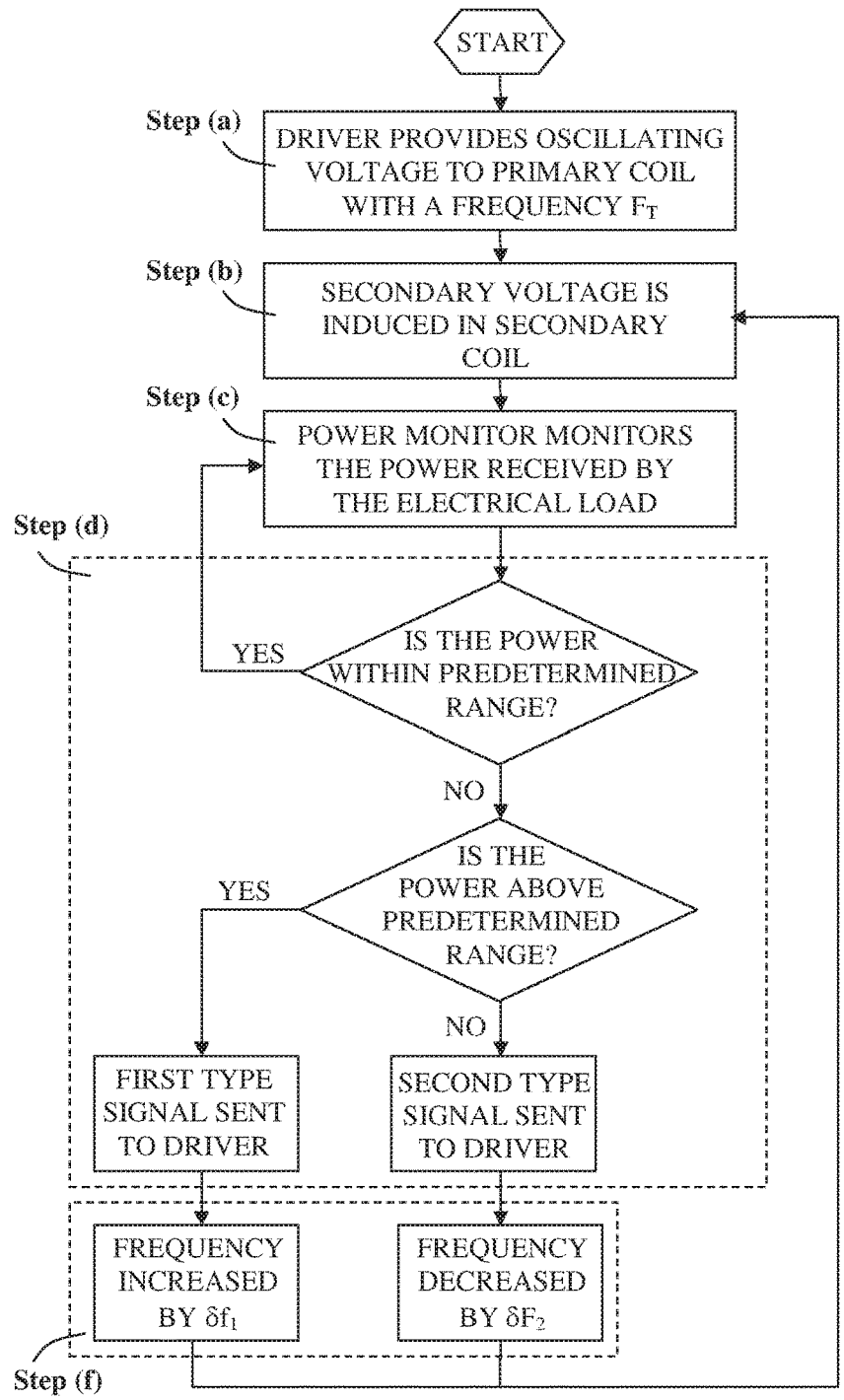
FIG. 10 is a flowchart showing a method for regulating power transfer by varying the power transmission frequency in an inductive power transfer system according to a further embodiment of the invention.

One example of a power regulation method using simple feedback signals is shown in the flowchart of FIG. 10. The method involves the following steps:

Step (a)—The driver 6230 provides an oscillating voltage at a transmission frequency $f_t$ which is higher than the resonant frequency $f_R$ of the system.

Step (b)—A secondary voltage is induced in the secondary coil 6320.

Step (c)—A power monitor in the secondary unit 6300, monitors the power received by the electric load 6340.

Step (d)—If the power received by the electric load 6340 lies within a predetermined range then no action is taken. If the power received by the electric load 6340 is below the predetermined range, then a feedback signal of a first type $S_a$ is sent to the driver. If the power received by the electric load 6340 is above the predetermined range, then a feedback signal of a second type $S_b$ is sent to the driver.

Step (e)—A feedback signal is received by the driver 6230.

Step (f)—If the received feedback signal is of the first type $S_a$, then the transmission frequency is increased by an incremental value $+\delta f_1$. If the received feedback signal is of the second type $S_b$, then the transmission frequency is decreased by an incremental value $-\delta f_2$.

It is noted that by using the power regulation method described above, when the power received by the load is too high, a series of feedback signals of the first type $S_a$ will be transmitted until the power is reduced into the acceptable range. Likewise when the power received by the load is too low, a series of feedback signals of the second type $S_b$ will be transmitted until the power is increased into the acceptable range. It is noted that the positive incremental value $\delta f_1$ may be greater than, less than or equal to the negative incremental value $\delta f_2$.

Alternatively, other power regulation methods using frequency adjustment may be used. For example, the operating parameters of the electric load 6340 may be monitored and their values may be transmitted to the power outlet 6200 via the inductive communications channel 6120. A processing unit (not shown) in the power outlet may then calculate the required transmission frequency directly.

The method described hereinabove, refers to a non-resonant transmission frequency lying within the linear region 8 (FIG. 7), higher than the resonant peak 2. It will be appreciated however that in alternative embodiments frequency-controlled power regulation may be achieved when the transmission frequency lies in the lower linear region of the resonance curve. Nevertheless, for certain embodiments, the selection of transmission frequencies in the higher linear 8 may be preferred, particularly where peak detection, as described above, is required.

Referring back to FIG. 6, various transmitters 6122 and receivers 6124 may be used for the inductive communication channel 6120. Where, as is often the case for inductive systems, the primary and secondary coils 6220, 6320 are galvanically isolated optocouplers, for example, may be used. A light emitting diode serves as a transmitter and sends encoded optical signals over short distances to a phototransistor which serves as a receiver. However, optocouplers typically need to be aligned such that there is a line-of-sight between transmitter and receiver. In systems where alignment between the transmitter and receiver may be difficult to achieve, optocoupling may be inappropriate and alternative systems may be preferred such as ultrasonic signals transmitted by piezoelectric elements or radio signals such as Bluetooth, WiFi and the like. Alternatively the primary and secondary coils 6220, 6320 may themselves serve as the transmitter 6122 and receiver 6124.

In certain embodiments, an optical transmitter (not shown), such as a light emitting diode (LED) for example, is incorporated within the secondary unit 6300 and is configured and operable to transmit electromagnetic radiation of a type and intensity capable of penetrating the casings of both the secondary unit 6300, and the inductive power outlet 6200. An optical receiver (not shown), such as a photodiode, a phototransistor, a light dependent resistors of the like, is incorporated within the inductive power outlet 6200 for receiving the electromagnetic radiation.

Figure 11:
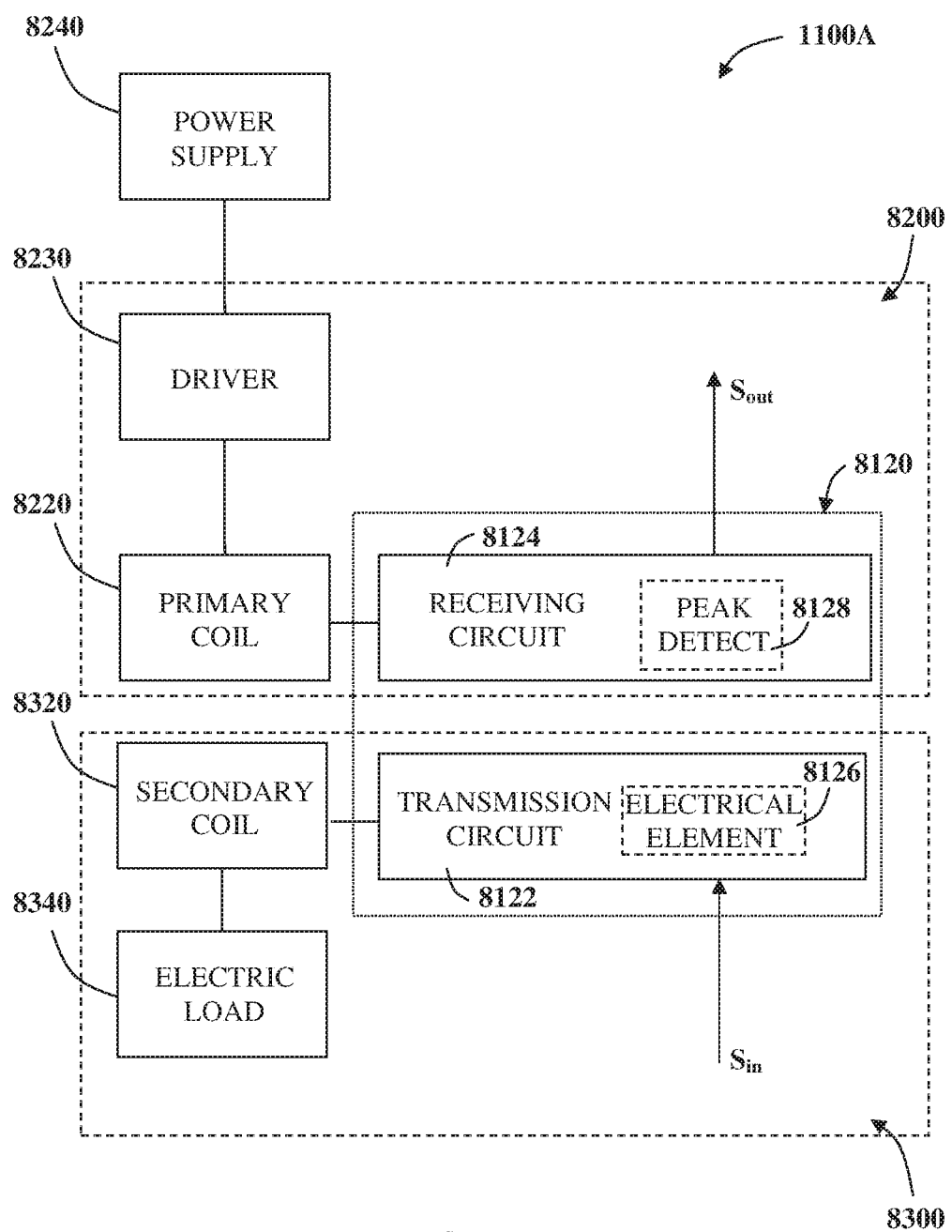
FIG. 11 is a block diagram showing the main elements of an inductive power transfer system with an inductive feedback channel according to still another embodiment of the present invention.

Reference is now made to the block diagram of FIG. 11, it is a particular feature of certain embodiments of the invention that an inductive communications channel 8120 is incorporated into the inductive power transfer system 1100A for transferring signals between an inductive power outlet 8200 and a remote secondary unit 8300. The inductive communication channel 8120 is configured to produce an output signal $S_{out}$ in the inductive power outlet 8200 when an input signal $S_{in}$ is provided by the remote secondary unit 8300 without interrupting the inductive power transfer from the outlet 8200 to the remote secondary unit 8300.

The inductive power outlet 8200 includes a primary inductive coil 8220 wired to a power source 8240 via a driver 8230. The driver 8230 is configured to provide an oscillating driving voltage to the primary inductive coil 8220, typically at a voltage transmission frequency $f_t$ which is higher than the resonant frequency $f_R$ of the system.

The remote secondary unit 8300 includes a secondary inductive coil 8320, wired to an electric load 8340, which is inductively coupled to the primary inductive coil 8220. The electric load 8340 draws power from the power source 8240. Where the electric load 8340 requires a direct current supply, for example a charging device for an electrochemical cell or the like, a rectifier 8330 may be provided to rectify the alternating current signal induced in the secondary coil 8320.

An inductive communication channel 8120 is provided for transferring signals from the secondary inductive coil 8320 to the primary inductive coil 8220 concurrently with uninterrupted inductive power transfer from the primary inductive coil 8220 to the secondary inductive coil 8320. The inductive communication channel 8120 may provide feedback signals to the driver 8230.

The inductive communication channel 8120 includes a transmission circuit 8122 and a receiving circuit 8124. The transmission circuit 8122 is wired to the secondary coil 8320, optionally via a rectifier 8330, and the receiving circuit 8124 is wired to the primary coil 8220.

The signal transmission circuit 8122 includes at least one electrical element 8126, selected such that when it is connected to the secondary coil 8320, the resonant frequency $f_R$ of the system increases. The transmission circuit 8122 is configured to selectively connect the electrical element 8126 to the secondary coil 8320. As noted above, any decrease in either the inductance L or the capacitance C increases the resonant frequency of the system. Optionally, the electrical element 8126 may be have a low resistance for example, with a resistance say under 50 ohms and Optionally about 1 ohm.

Typically, the signal receiving circuit 8124 includes a voltage peak detector 8128 configured to detect large increases in the transmission voltage. In systems where the voltage transmission frequency $f_t$ is higher than the resonant frequency $f_R$ of the system, such large increases in transmission voltage may be caused by an increase in the resonant frequency $f_R$ thereby indicating that the electrical element 8126 has been connected to the secondary coil 8320. Thus the transmission circuit 8122 may be used to send a signal pulse to the receiving circuit 8124 and a coded signal may be constructed from such pulses.

According to some embodiments, the transmission circuit 8122 may also include a modulator (not shown) for modulating a bit-rate signal with the input signal $S_{in}$. The electrical element 8126 may then be connected to the secondary inductive coil 8320 according to the modulated signal. The receiving circuit 8124 may include a demodulator (not shown) for demodulating the modulated signal. For example the voltage peak detector 8128 may be connected to a correlator for cross-correlating the amplitude of the primary voltage with the bit-rate signal thereby producing the output signal $S_{out}$.

In other embodiments, a plurality of electrical elements 8126 may be provided which may be selectively connected to induce a plurality of voltage peaks of varying sizes in the amplitude of the primary voltage. The size of the voltage peak detected by the peak detector 8128 may be used to transfer multiple signals.

Figure 12:
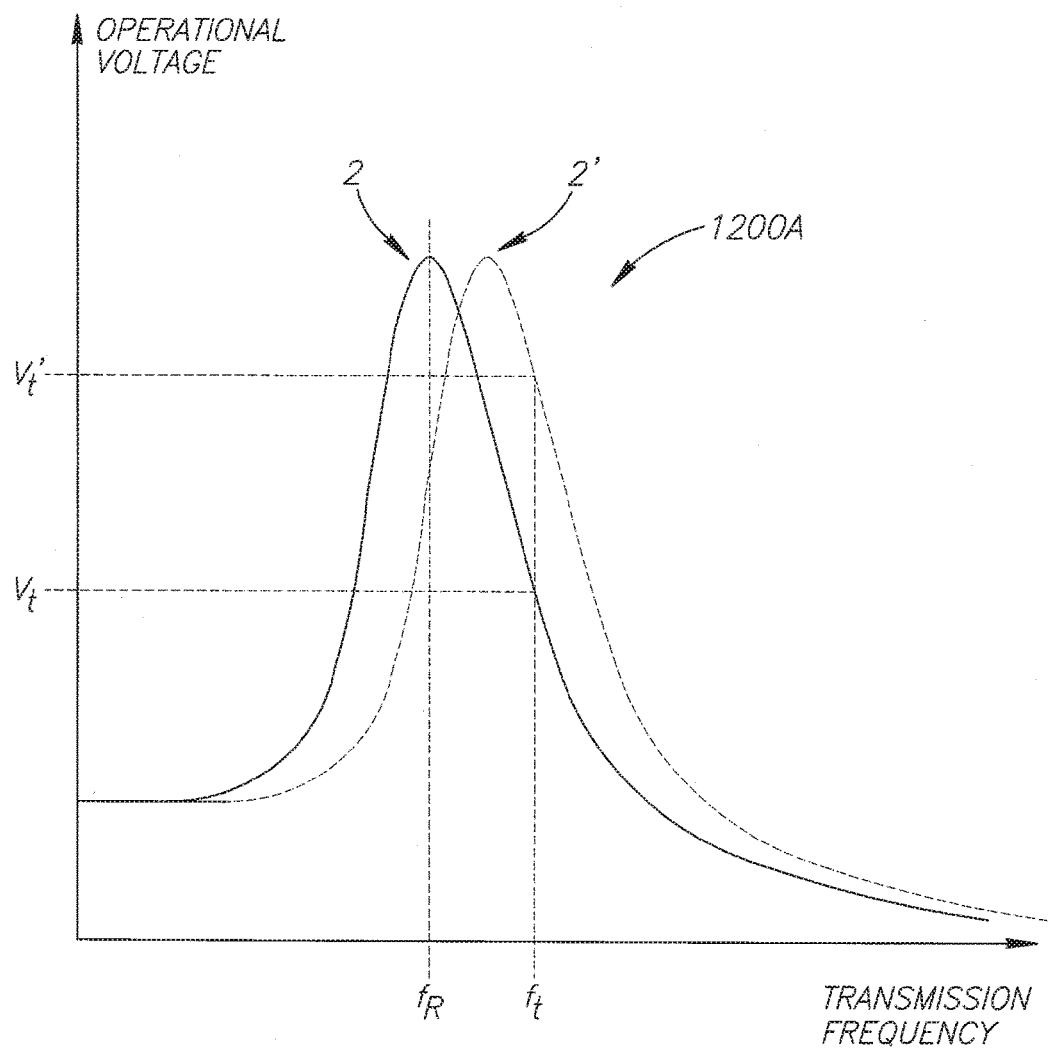
FIG. 12 is a graph showing how the variation of operational voltage with transmission frequency is affected by changes in resonant frequency of the system.

Reference is now made to FIG. 12, a graph showing how the amplitude of the operational voltage varies according to the transmission frequency. It is noted that the voltage is at its highest when the transmission frequency is equal to the resonant frequency $f_R$ of the system, this maximum amplitude is known as the resonance peak 2. If the resonant frequency $f_R$ of the system increases, a new resonance peak 2' is produced.

According to another embodiment of the invention, such as illustrated in FIG. 11, an inductive power transfer system 1100A operates at a given transmission frequency $f_t$ which is higher than the resonant frequency $f_R$ of the system 1100A. The normal operating voltage $V_t$ is monitored by the voltage peak detector 8128. When the electric element 8126 is connected to the secondary inductive coil 8320 the resonant frequency of the system increases. Therefore, the operating voltage increases to a higher value $V_t'$. This increase is detected by the voltage peak detector 8128.

It is noted that in contradistinction to prior art inductive signal transfer systems such as described in U.S. Pat. No. 5,455,466 to Terry J. Parks and David S. Register, the present invention enables data signals to be transferred from the secondary coil 8320 to the primary coil 8220 concurrently with inductive transfer of power from the primary coil 8220 to the secondary coil 8320. Consequently, the signal transfer system may be used to provide feedback signals for real time power regulation.

Figure 13:
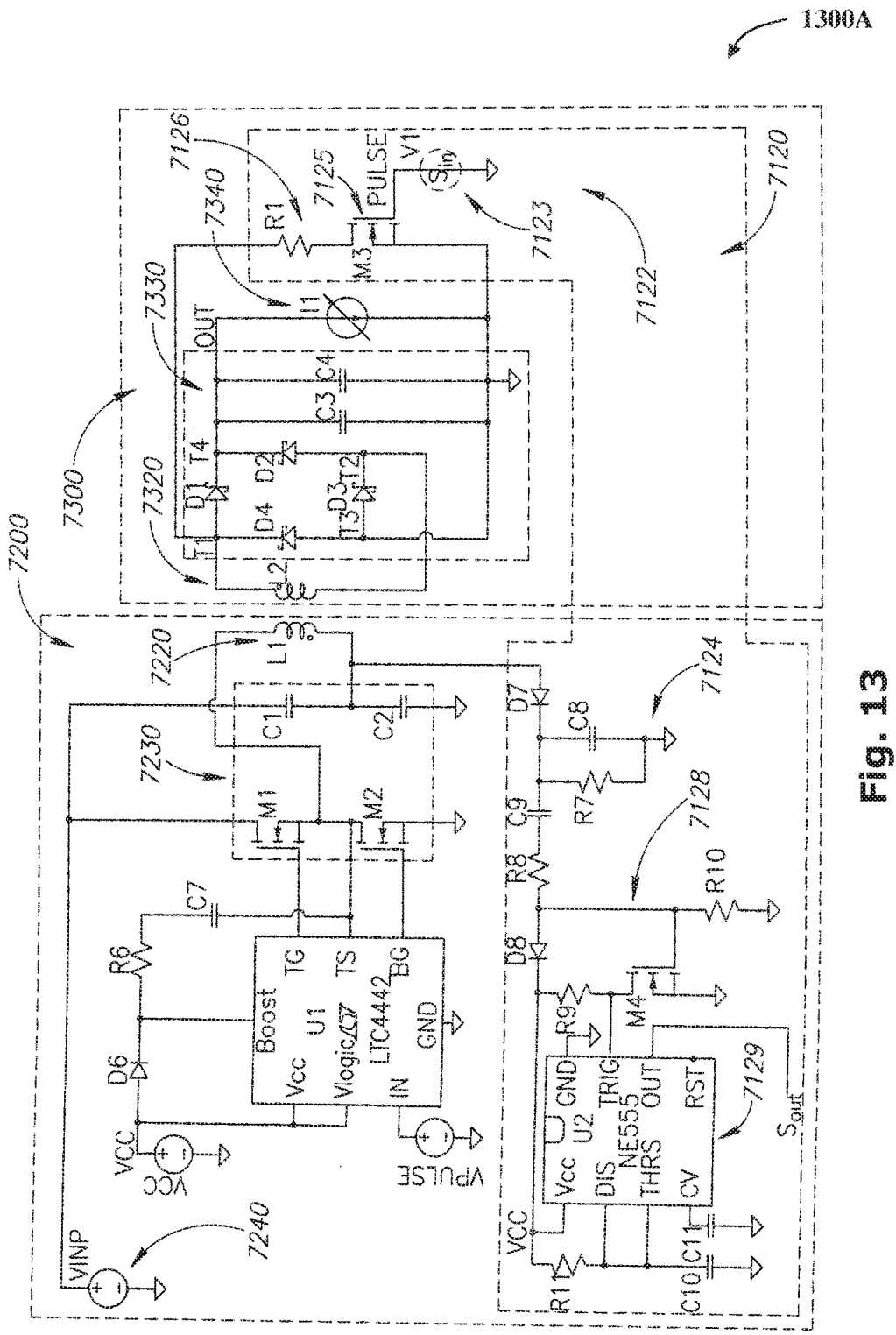
FIG. 13 is a circuit diagram of an inductive power transfer system including an inductive feedback channel for providing coil-to-coil signal transfer concurrently with uninterrupted inductive power transfer between the coils in accordance with yet another embodiment of the invention.

Reference is now made to FIG. 13, showing an exemplary circuit diagram 1300A of an inductive power outlet 7200 and a secondary unit 7300, according to another embodiment of the invention. An inductive feedback channel (the inductive communication channel) 7120 is provided for transferring signals between the coils concurrently with uninterrupted inductive power transfer.

The inductive power outlet 7200 comprises a primary coil 7220 driven by a half-bridge converter 7230 connected to a power source 7240. The half-bridge converter 7230 is configured to drive the primary coil 7220 at a frequency higher than the resonant frequency of the system. The secondary unit 7300 comprises a secondary coil 7320 wired to the input terminals $T_1$, $T_2$ of a rectifier 7330, and an electric load 7340 wired to the output terminals $T_3$, $T_4$ of the rectifier 7330.

The inductive feedback channel (the inductive communication channel) 7120 comprises a transmission circuit 7122, in the secondary unit 7300 and a receiving circuit 7124 in the inductive power outlet 7200. The transmission circuit 7122 comprises an electrical resistor 7126 connected to the rectifier 7330 via a power MOSFET switch 7125. A modulator 7123 may provide an input signal $S_{in}$ to the power MOSFET 7125.

It is noted that in this embodiment the transmission circuit 7122 is wired to one input terminal $T_1$ and one output terminal $T_3$ of the rectifier 7330. This configuration is particularly advantageous as, even when the transmission circuit 7122 is connected, the resistor 7126 only draws power from the system during one half of the AC cycle, thereby significantly reducing power loss.

The receiving circuit 7124 includes a voltage peak detector 7128 that is configured to detect increases in the transmission voltage, and a demodulator 7129 for producing an output signal $S_{out}$.

Figure 14:
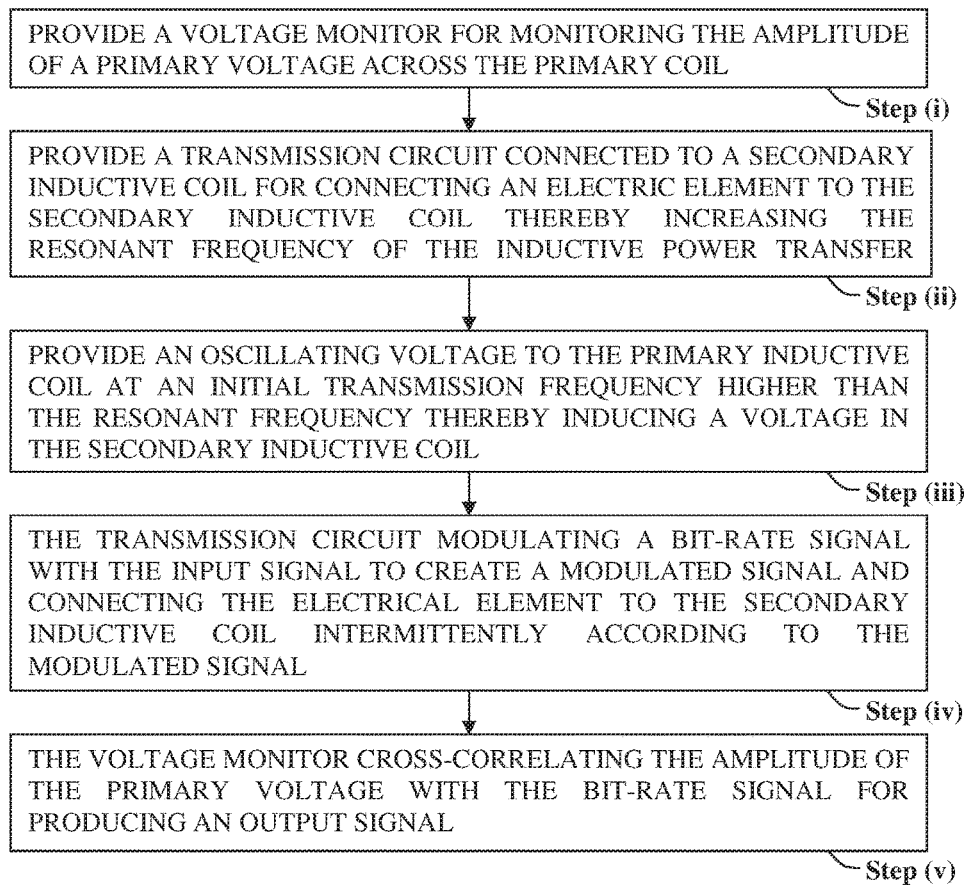
FIG. 14 is a flowchart showing a method for inductively transferring a signal from the secondary inductive coil to a primary inductive coil of an inductive power transfer system according to still a further embodiment of the invention.

Reference is now made to FIG. 14, a flowchart is presented showing the main steps in a method for transferring a signal from the secondary inductive coil to a primary inductive coil of an inductive power transfer system. The method includes the following steps:

Step (i)—connecting the primary inductive coil to a voltage monitor for monitoring the amplitude of a primary voltage across the primary coil;

Step (ii)—connecting the secondary inductive coil to a transmission circuit for selectively increasing the resonant frequency of the inductive power transfer system;

Step (iii)—providing an oscillating voltage to the primary inductive coil at an initial transmission frequency higher than the resonant frequency thereby inducing a voltage in the secondary inductive coil;

Step (iv)—using the transmission circuit to modulate a bit-rate signal with the input signal to create a modulated signal and connecting the electrical element to the secondary inductive coil intermittently according to the modulated signal, and Step (v)—using the voltage monitor to cross-correlate the amplitude of the primary voltage with the bit-rate signal for producing an output signal.

Therefore, the inductive communication channel 7120 (FIG. 13) may be used to transfer a feedback signal from the secondary inductive coil 7320 (FIG. 13) to the primary inductive coil 7220 (FIG. 13) for regulating power transfer across an inductive power coupling as described above.

It will be appreciated that embodiments of the present invention may be useful in a wide range of applications. Inductive power receivers may be used to wirelessly provide power for a variety of electrical devices. Embodiments of the present invention may be integrated into such inductive power receivers. In particular, because non-resonant transmission uses lower transmission voltages, heat loss from the non-resonant system is lower. Thus embodiments of the current invention may be of particular use when incorporated within high power applications such as power tools, kitchen appliances, bathroom appliances, computers, media players, office equipment and the like.

The reduced heat loss, associated with embodiments of the non-resonant systems of the invention, is particularly useful when heat dissipation is difficult for example when power receiver has small dimensions or for heat-sensitive equipment such as measuring devices. Also, it is desirable that devices implanted into a living body do not dissipate large amounts of heat into the body. Therefore, non-resonant inductive transfer is well suited to implanted devices, such as pace makers, trackers and the like.

It is also noted that in recent years public concern about the threat of a global energy crisis has resulted in a greater emphasis being placed upon optimizing the efficiency of energy transfer. It is difficult to achieve more demanding specifications using existing technology and, in this context, embodiments of the present invention may be used to provide high powers with very low energy losses. Consequently the current invention is an important element in the drive for greater efficiency.

Furthermore embodiments of the present invention may be advantageously utilized in inductive power transfer systems in any of the various applications in which power is transferred from a primary coil to a remote secondary coil. Amongst others, such applications include:
- inductive chargers for use charging electronic devices,
- inductive power adaptors for powering electronic devices such as computers, televisions, kitchen appliances, office equipment and the like,
- medical applications in which power is transferred remotely to devices implanted in a patient,
- communications with remote RFID tags,
- military application in which power is transferred across thick armored plating,
- communication or inductive energy transfer to secondary inductive coils buried underground.
- communication or inductive energy transfer to secondary inductive coils submerged under water, for example in submarine applications, and
- communication or inductive energy with secondary coils which are moving relative to the primary coil.

Thus, by using a transmission voltage oscillating at a frequency different from the resonant frequency of the system, the inductive transfer system has a higher tolerance to environmental fluctuations and variations in inductive coil alignment than other transfer systems and the frequency may be used to regulate power transfer. Moreover, when the transmission frequency is higher than the resonant frequency of the system, a peak detector may be used to indicate hazards and provide an inductive communication channel.

Energy Efficient Inductive System

Figure 15A:
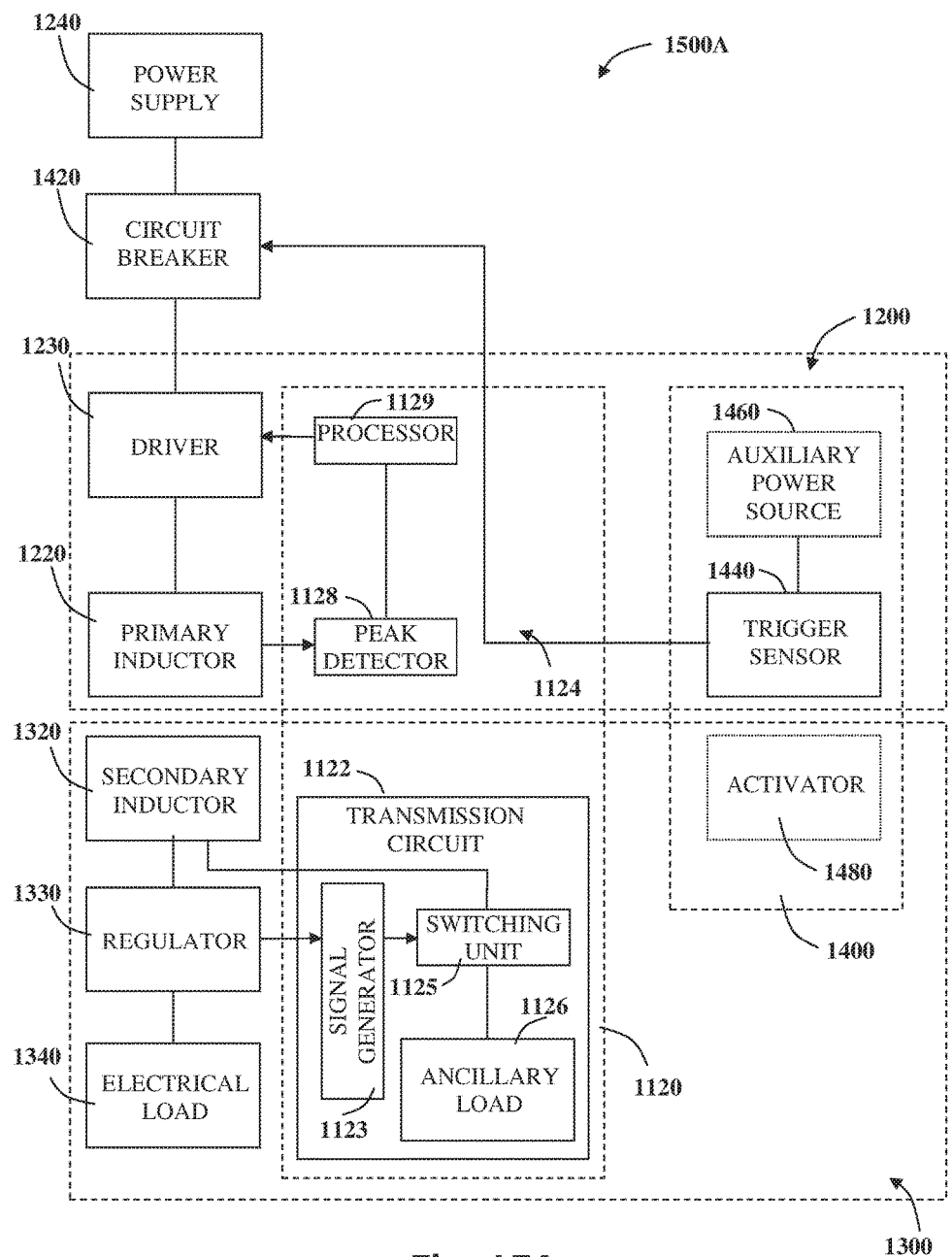
FIG. 15A is a block diagram representing selected components of an energy efficient inductive power transfer system incorporating activation and termination mechanisms.

Reference is now made to the block diagram of FIG. 15A representing selected components of an embodiment of an energy efficient inductive power transfer system 1500A. The inductive power transfer system 1500A includes an inductive power outlet 1200 and an inductive power receiver 1300 and is configured to switch between transmission mode and standby mode.

In standby mode, the system 1500A may be dormant with the inductive power outlet 1200 and inductive power receiver 1300 waiting for an activation signal before transitioning to transmission mode. In transmission mode, the inductive power system 1500A is configured and operable to draw power from a power supply 1240, such as a mains electricity supply, a vehicle battery, a power generator, fuel cell or the like, to an electrical load 1340.

It will be appreciated, that such an inductive power transfer system 1500A may significantly reduce power losses associated with prior art power transfer systems. During the standby mode little or no power may be drawn from the power supply 1240. The inductive power outlet 1200 may be configured to switch to transmission mode only in the presence of a suitable inductive power receiver 1300. Furthermore, the system 1500A may be operable to revert to standby mode when no power need be transferred, for example when the inductive power receiver 1300 is removed or the electric load 1340 requires no further power. Thus power is only drawn by the system 1500A when actually required. Various activation and termination protocols may be used with the system, such as described hereinafter.

Figure 15B:
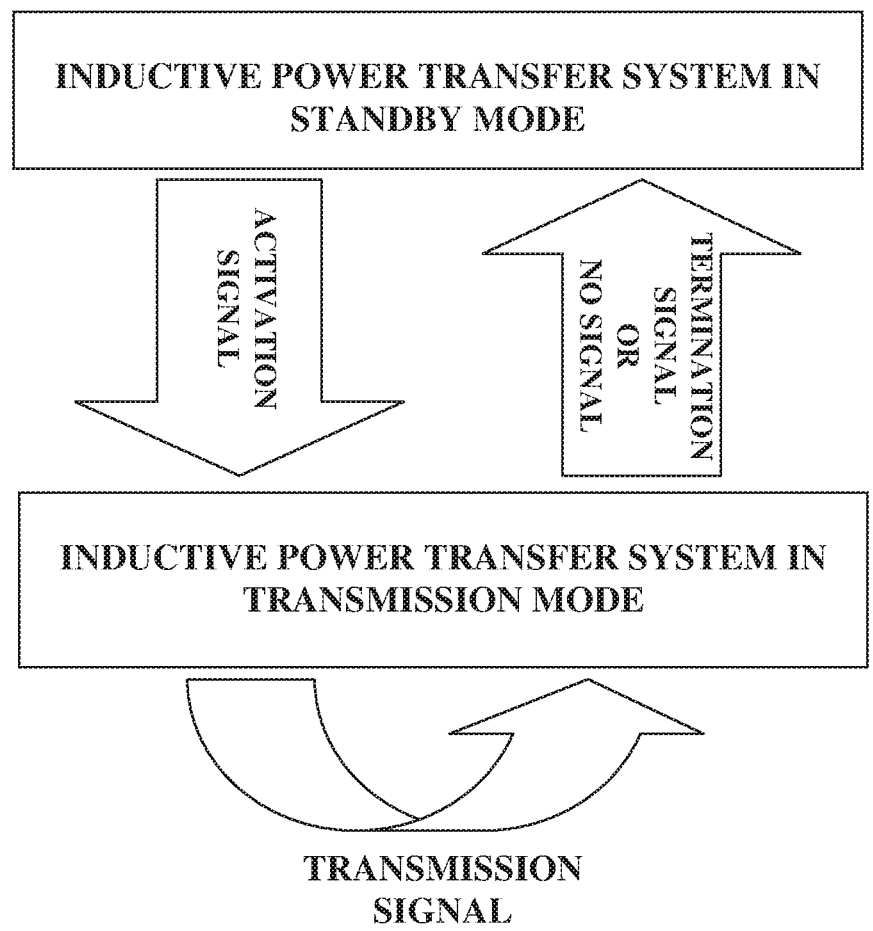
FIG. 15B is a flowchart representing transition between standby mode and transmission mode for activating and terminating an energy efficient inductive power transfer system.

Reference is now made to the flowchart of FIG. 15B, the inductive power transfer system 1500A (FIG. 15A) may switch between standby mode and transmission mode by a number of pathways. When in standby mode, the inductive power outlet 1200 (FIG. 15A) or the inductive power receiver 1300 (FIG. 15A) may be configured to wait for an activation signal. If such an activation signal is received, the system 1500A may switch to transmission mode. Where appropriate, activation of the system 1500A may involve an initial trigger signal activating the inductive power outlet 1200 and an authentication process confirming the presence of a suitable inductive power receiver 1300.

When in transmission mode, the inductive power transfer system 1500A may be configured to periodically transfer signals between the inductive power receiver 1300 and the inductive power outlet 1200, such as described hereinabove in relation to FIG. 10, for example.

As detailed below, various transmission signals may be used with the system, for example, instructions may be sent from the inductive power receiver 1300 to the inductive power outlet 1200 to increase power by a certain interval, to decrease power by a certain interval, to maintain the same power, to terminate power transfer or the like. Where no such transmission signals are received, the inductive power outlet 1200 may be configured to stop driving the primary inductor 1220 (FIG. 15A) and to revert to the standby mode.

In particular, the inductive power transfer system 1500A may be configured to revert to standby mode when a termination signal is transferred between the inductive power receiver 1300 and the inductive power outlet 1200. Where appropriate, the inductive power receiver 1300 may be configured to send a termination signal to the inductive power outlet 1200 when the electric load 1340 (FIG. 15A) no longer requires power. For example, where the electric load 1340 is an electrochemical cell being charged by an inductive charger, say, a termination signal may be generated when the electrical cell is fully charged.

It will be appreciated that an inductive power transfer system such as disclosed herein may reduce significantly the amount of power drawn by dormant power adaptors, chargers and the like.

Referring back to FIG. 15A, the system 1500A may include a trigger mechanism 1400 and a signal transfer mechanism 1120. The trigger mechanism 1400 may be used while the inductive power transfer system 1500A is in the standby mode, to provide an initial trigger to generate an activation signal such that the inductive power transfer system 1500A switches to transmission mode. The signal transfer mechanism 1120 may provide a channel for the inductive power receiver 1300 to send instruction signals, such as identification signals, authentication signals, transmission signals, termination signals or the like to the inductive power outlet 1200.

The inductive power outlet 1200 of the inductive power transfer system 1500A includes a primary inductor 1220 such as a primary inductive coil, for example, connectable to the power supply 1240 via a driver 1230. The driver 1230 provides the electronics necessary for supplying an oscillating voltage to the inductive coil 1220. The inductive power receiver 1300 typically includes a secondary inductor 1320, such as a secondary inductive coil, a regulator 1330 and an electrical load 1340.

The secondary inductive coil 1320 is configured to inductively couple with the primary inductive coil 1220 of the inductive power outlet 1200. Where required, the regulator 1330 may include a rectifier to convert alternating current induced across the secondary coil 1320 to a direct current signal for supplying the electrical load 1340. A rectifier 1330 may be necessary, for example, where the electrical load 1340 comprises an electrochemical cell to be charged.

The trigger mechanism 1400 may control the connection between the power supply 1240 and the inductive power outlet 1200. The trigger mechanism 1400 may include a circuit breaker 1420 and a trigger sensor 1440. Optionally, trigger mechanism 1400 may further include an auxiliary power source 1460 for providing power when the inductive power outlet 1200 is disconnected from its power supply 1240. Various auxiliary power sources 1460 may be used in embodiments of the trigger mechanism 1400 such as electrochemical cells, capacitors and the like, which may be configured to store energy while the inductive power outlet 1200 is connected to the power supply 1240 for use when the inductive power outlet 1200 is disconnected. Still other auxiliary power sources may include electricity generating elements such as solar cells, piezoelectric elements, dynamos or the like.

The circuit breaker 1420 may be configured to receive a disabling signal from the trigger and in response to provide an electrical connection between the power supply 1240 and the inductive power outlet 1200. Various circuit breakers 1420 may be used to disconnect the inductive power outlet 1200 from the power supply 1240 as suit requirements. For example, an electronic switch may be provided such as a Metal-Oxide Semiconductor Field-Effect Transistor (MOSFET) or the like the gate terminal of which may be configured to receive the electrical signals sent by the trigger sensor 1440. Other circuit breakers may include for example, a single pole switch, a double pole switch, a throw switch or the like.

The trigger sensor 1440 is configured to detect a release signal indicating the proximity of a possible inductive power receiver 1300. The trigger 1440 may be further configured to disable the circuit breaker 1420 when the release signal is detected. Optionally, an activator 1480 incorporated into the inductive power receiver 1300 is configured to produce the release signal which is detectable by the trigger 1440.

In one embodiment the trigger mechanism 1400 may include a magnetic detector such as a Hall Effect switch, reed switch or the like. The magnetic switch may be configured to detect an increase in magnetic field as a result of the approach of an activating magnetic element associated with the inductive power receiver 1300. It will be appreciated that a Hall Effect switch may be configured to detect the approach of an alignment magnet associated with the inductive power receiver 1300 which further functions as the activating magnetic element 1480 for the trigger mechanism 1400. It will be further appreciated that other magnetic switches may be used in other embodiments of the trigger mechanism as will occur to the skilled practitioner. Still other embodiments of the trigger mechanism may be used, for example, as described in the applicants co-pending patent application PCT/IL2010/001013 which is incorporated herein by reference.

The signal transfer system 1120 may include an inductive feedback channel 7120 such as described hereinabove in relation to FIG. 13. The regulator 1330 of the inductive power receiver may be in communication with a transmission circuit 1122 including a signal generator 1123, a switching unit 1125 and an ancillary load 1340. The signal generator 1123 may be a modulator 7123 such as described in FIG. 13. The switching unit 1125 may be a MOSFET 7125 such as described in FIG. 13. Variously, the ancillary load 1126 may be an electrical resistor 7126 such as described in FIG. 13, although other electrical elements such as capacitors, inductors and the like may alternatively or additionally serve as the ancillary load 1126. The transmission circuit 1122 may thus modulate the power drawn by the secondary inductor 1320. The modulated power may be detected by a signal detector 1124 associated with the inductive power outlet 1200.

The inductive power outlet 1200 includes a signal detector 1124 comprising a peak detector 1128 and a processing unit 1129. The peak detector 1128 may be configured to detect peaks in primary voltage across the primary inductor or primary current supplied to the primary inductor. Thus, the peak detector 1128 may be able to detect when the ancillary load is connected to the secondary inductor 1320. The processing unit 1129, such as the demodulator 7129 described above in relation to FIG. 13, may be provided to determine the frequency of peak pulses.

The signal transfer system 1120 may be used to transmit instruction signals such as identification signals, authentication signals, transmission signals, termination signals or the like to the inductive power outlet 1200 in the form of peak pulses having characteristic frequencies.

The regulator 1330 of the inductive power receiver 1300, which may include a controller, rectifier, capacitors, microcontroller, voltage monitor or the like, is in communication with the transmission circuit 1122.

The regulator 1330 may be operable to monitor induced secondary voltage across the secondary inductor 1320 and to compare the induced voltage with reference values. By comparing the secondary voltage with threshold values, the regulator 1330 may determine whether the secondary voltage lies within a permissible range of values. Accordingly, instruction signals may be selected by the regulator 1330 and generated by the transmission circuit 1122 instructing the inductive power outlet 1200 to adjust the induced voltage across the secondary inductor 1320.

It will be appreciated that in standby mode no voltage is induced across the secondary inductor 1320. As outlined in greater detail below, in standby mode, the regulator 1320 and transmission circuit 1122 may be further operable to respond to an activation voltage pulse induced across secondary inductor 1320 by generating an identification instruction signal (ID signal). The ID signal may be detected by the inductive power outlet 1200 thereby confirming the presence of the inductive power receiver 1300 and optionally its required operating parameters.

Figure 16A:
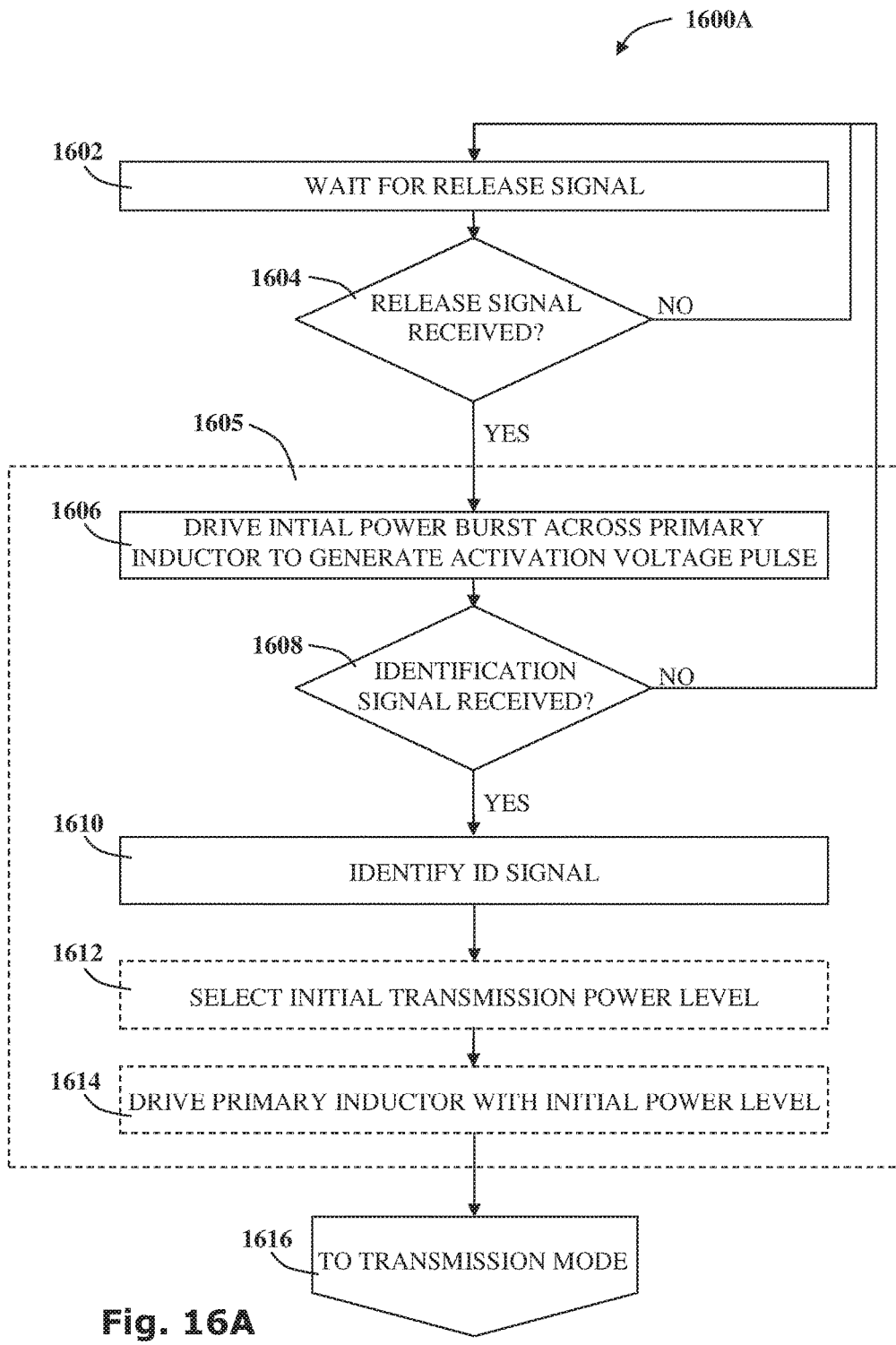
FIG. 16A is a flowchart representing selected stages of a possible protocol for transition from standby phase to the transmission phase in the inductive power outlet of an energy efficient inductive power outlet.

Reference is now made to the flowchart of FIG. 16A showing selected stages of a possible protocol for transition from standby phase to the transmission phase in the inductive power outlet. In standby phase, the dormant inductive power outlet waits for a release signal—step 1602.

The release signal indicates to the inductive power outlet that a compatible inductive power receiver may have been placed within transmission range. Such a release signal may be inter alia a change in local magnetic field associated with a trigger magnet in the inductive power receiver. Accordingly in one embodiment the inductive power outlet incorporates a Hall switch which is configured to detect changes in the local magnetic field. Other release signal mechanisms will occur to those skilled in the art such as signals detectable using piezoelectric elements, light sensors, audio sensors and the like to suit requirements.

If no release signal is received the outlet remains in standby mode—step 1604. When a release signal is detected by the outlet an authentication process—step 1605 is initiated during which the presence of the inductive power receiver is confirmed. The authentication process may start by the driver of the primary inductor producing an initial power of sufficient intensity to induce an activation voltage pulse across the secondary inductor of the inductive power receiver—step 1606. For example, a primary voltage may be driven across the primary inductor such that an activation voltage pulse of eight volts is induced across the secondary inductor.

The inductive power outlet may be operable to detect an ID signal in response to the initial power burst—step 1608. If the inductive power outlet receives an ID signal response from a recognized inductive power receiver, then the ID signal may be identified—step 1610 and the mode switched to transmission mode—step 1616. Optionally, depending upon the identity of the ID signal, an initial transmission power level may be selected—step 1612 according to what ID signal is received and the primary inductor driven with the initial transmission power level—step 1614. Alternatively, the initial transmission power level may be the transmission power level of the initial power burst.

Optionally, the initial power burst across the primary inductor may be repeated for a fixed number of iterations before the inductive power outlet reverts to standby mode. Variously, the driving voltage of the initial power burst may be constant or changing. According to one embodiment, the driver of the inductive power outlet may be operable to produce an initial 15 millisecond burst of oscillating voltage across which may repeated, say every 256 milliseconds or so. After five iterations or so, if no ID signal is received, the inductive power outlet may revert to standby mode.

Various ID signals may be used in embodiments of the present disclosure, for example, where the inductive power outlet includes a peak detector, as described hereinabove, a transmission circuit may be used to modulate the primary voltage across the primary inductor, or primary current drawn by the primary inductor, with peak pulses having characteristic frequencies which are identifiable as generated by recognized inductive power receivers. In one embodiment, ID signals may peak pulses having characteristic frequencies selected from 500 hertz, 1 kilohertz and 8 kilohertz. The selected characteristic frequency of the ID signal may provide further instructions to the inductive power outlet for example relating to required transmission parameters, user specific data, billing information or the like.

The power level of the induced voltage may be regulated by adjusting a variety of parameters of the driving voltage. For example, where non-resonant power transmission is used, such as described hereinabove, the power level may be determined by the selected operating frequency. Optionally, the initial voltage across the primary inductor may be steadily increased by decreasing the driving frequency from 476 kilohertz to 313 kilohertz during the initial burst. Alternatively, the power level may be selected by adjusting the duty cycle or amplitude of the driving voltage.

Figure 16B:
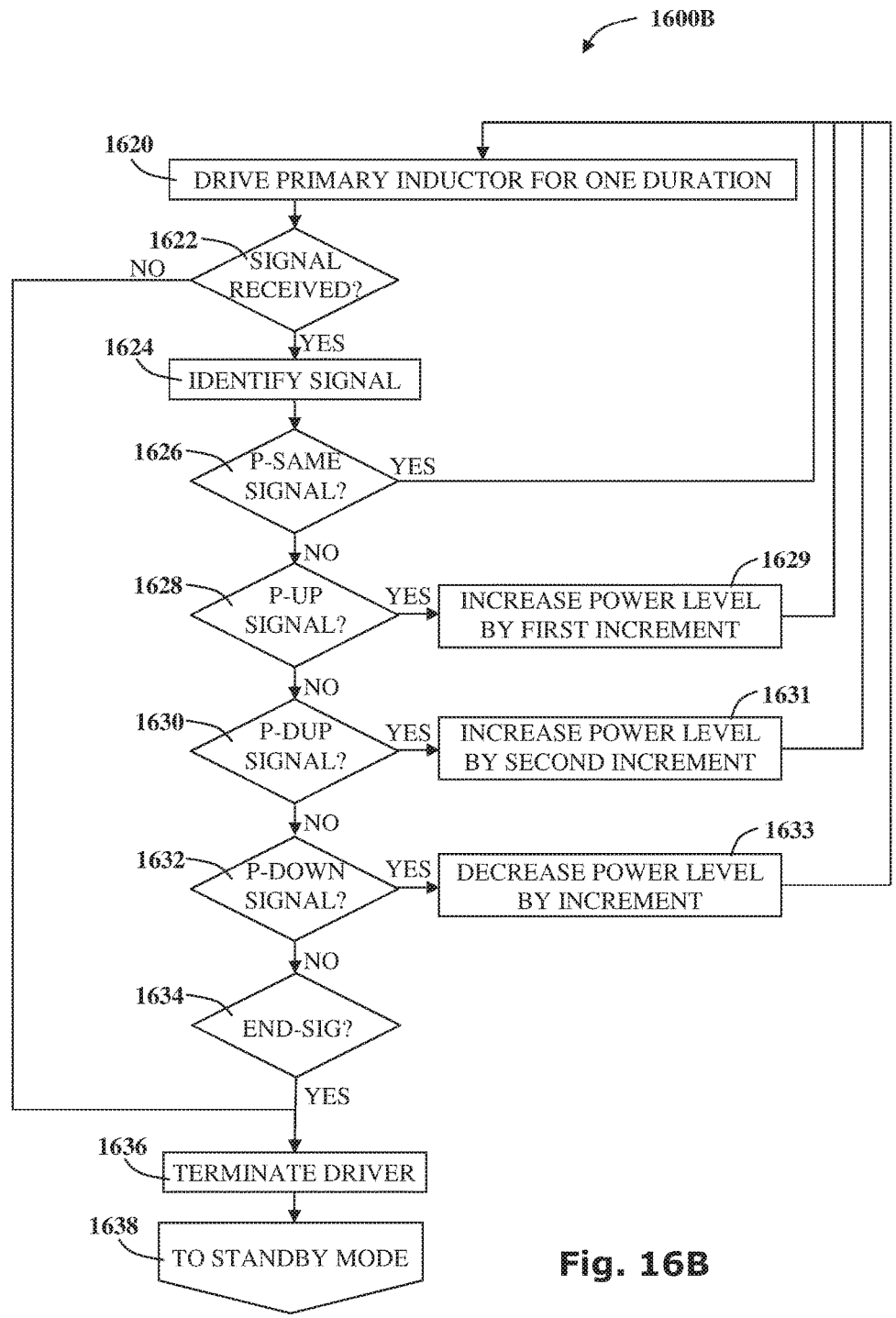
FIG. 16B is a flowchart representing a possible transmission mode protocol for an inductive power outlet.

Reference is now made to FIG. 16B representing a possible transmission mode protocol 1600B for use with an inductive power outlet. Optionally, such a protocol may be initiated by the transition protocol of FIG. 16A, alternatively an inductive power outlet may be activated in other ways, such as by manually operating a power switch, connecting to a mains power supply or the like.

In transmission mode, the inductive power outlet may be operable to drive the primary inductor for a limited time duration—step 1620, for example for 10 milliseconds or so. At the end of the limited time duration, the outlet may be operable to terminate the operation—step 1636 unless an instruction signal is received—step 1622. Such a system may enable an energy efficient inductive power outlet to draw power only when required and to shut down when not needed. If an instruction signal is received from the inductive power receiver, the signal may be identified—step 1624 and acted upon, for example, as follows:

if a perpetuation signal P-SAME is received from the inductive power receiver—step 1626, then the driver may continue to drive the primary inductor for a further duration;

if a first power increase signal P-UP is received from the inductive power receiver—step 1628, then the driver may increase the power level by a first incremental value—step 1629;

if a second power increase signal P-DUP is received from the inductive power receiver—step 1630, then the driver may increase the power level by a second incremental value—step 1631;

if a power decrease signal P-DOWN is received from the inductive power receiver—step 1632, then the driver may decrease the power level by an incremental value—step 1633; or if a termination signal END-SIG is received from the inductive power receiver—step 1634, then the driver may be terminated—step 1636, thereby ceasing to drive the primary inductor and the inductive power outlet reverting to standby mode.

To better explain the transmission protocol and for illustrative purposes only, an example of the protocol is described below in which the inductive power outlet drives a non-resonant transmission voltage. The protocol may also be applicable to resonant transmission systems.

The instruction signals may comprise modulated peak pulses with each signal having a characteristic frequency. In one particular embodiment the perpetuation signal P-SAME may have a characteristic frequency of 500 hertz, the first power increase signal P-UP may have a characteristic frequency of 8 kilohertz, the second power increase signal P-DUP may have a characteristic frequency of between 1.5 and 5 kilohertz, the termination signal END-SIG may have a characteristic frequency of 250 hertz. It will be appreciated that other characteristic frequencies may alternatively be used. Indeed, where required, other instruction signals, such as additional power decrease signal, for example, may be additionally or alternatively transferred as suit requirements.

Referring again to FIG. 7, as noted above, where the transmission frequency is selected from the non-resonant region 8 above the resonant frequency of the system the output power of the secondary inductor may be regulated by increasing or decreasing the driving frequency by incremental amounts. According to one embodiment in which the transmission frequency is around 10 megahertz the incremental frequency steps δf may be selected from within a permissible range of 277 kilohertz to 357 kilohertz or so.

In one system the driver 1230 (FIG. 15A) of the inductive power outlet may include a microcontroller unit operable to calculate the incremental frequency value $f_{op+1}-f_{op}$ according to the formula:

$$f_{op+1} - f_{op} = \frac{F_{sys}}{\text{divider value}} - \frac{F_{sys}}{\text{divider value} - 1}$$

where $F_{sys}$ is the transmission frequency of the driver, and the divider value is an integer value. Where required, different incremental values may be used for increasing and decreasing the voltage or power.

As noted, two power increase signals P-UP and P-DUP may request different incremental power increases. Accordingly the second power increase signal P-DUP may be used to step up power by larger increments, say twice the size of the standard increments. This may be useful for example where the initial voltage is particularly low.

Figure 16C:
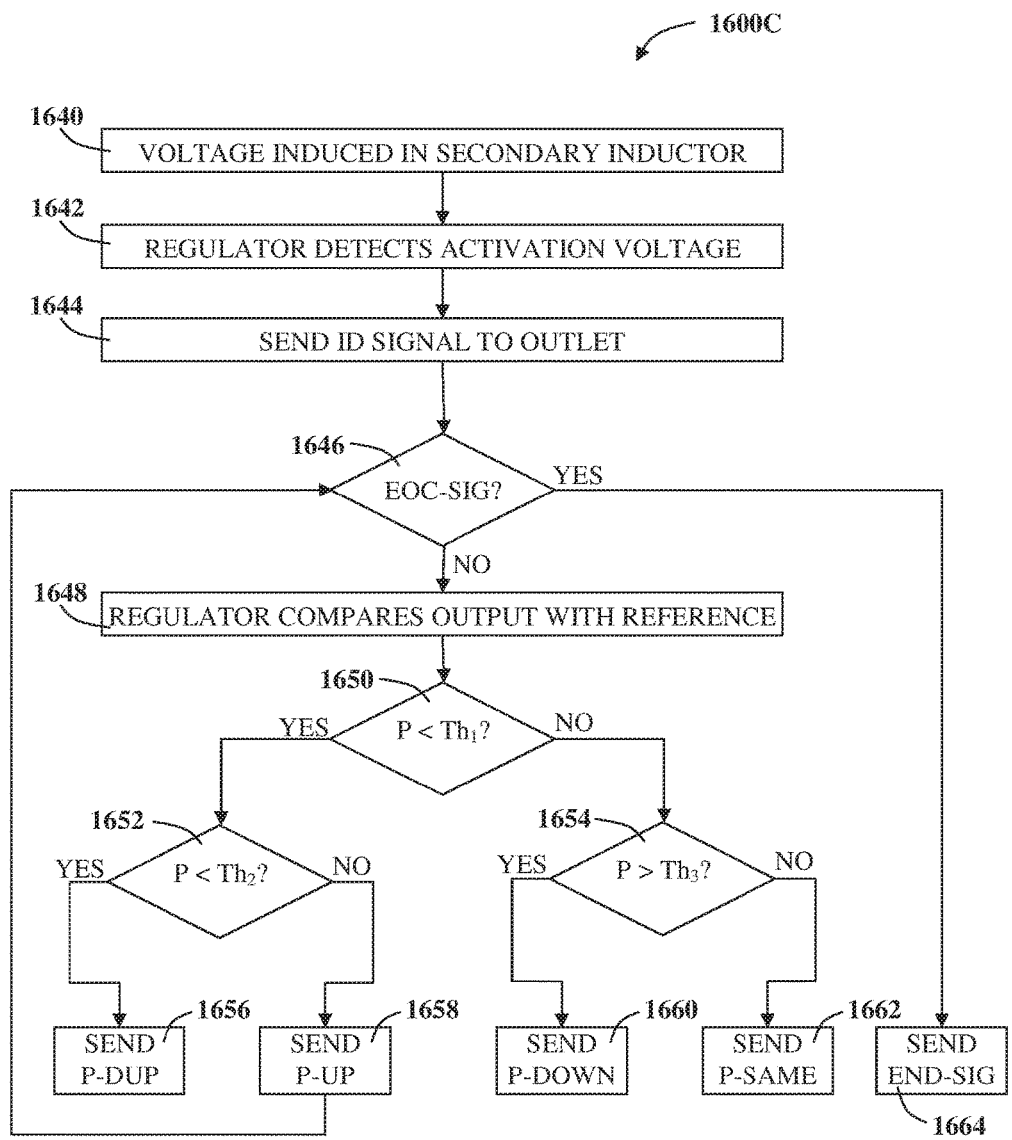
FIG. 16C is a flowchart representing operation of an energy efficient inductive power receiver.

Turning now to the inductive power receiver, reference is now made to FIG. 16C showing possible operational steps during inductive power reception. The inductive power receiver may be activated when a voltage is induced across the secondary inductor—step 1640, when the regulator may detect the activation voltage—step 1642 an identification signal may be sent to the inductive power outlet—step 1644.

Such an identification signal (ID signal) may serve to switch the inductive power transmitter to transmission mode as described above in relation to FIG. 16A. For example, an induced voltage of about 8V and producing a current of about 3 milliamps and lasting about 5 milliseconds or so, may power a microcontroller associated with the regulator to activate the sending of an ID signal to the inductive power outlet. In one embodiment, a transmission circuit 1122 (FIG. 15A) may be used to produce a modulated peak pulse having a characteristic frequency selected from 500 hertz, 1 kilohertz, 8 kilohertz or the like. Variously, the inductive power receiver may select an ID signal such that predetermined transmission parameters may be selected for operating the inductive power outlet.

It is noted that during power transfer, the inductive power receiver is operable to periodically send instruction signals to the inductive power outlet. The instruction signals may be selected according to various factors as outlined below.

Where, the inductive power receiver is operable to detect an end-of-charge command EOC-SIG indicating that the electric load, such as an electrochemical cell or the like, requires no more power—step 1646. If such an end-of-charge command is detected, the inductive power receiver may be operable to send a termination signal END-SIG to the inductive power transmitter—step 1664. As outlined above in relation to FIG. 16B, the termination signal instruct the inductive power outlet to revert to standby mode. According to one embodiment, the termination signal may comprise a modulated peak pulse having a characteristic frequency of 250 hertz. It will be appreciated that such a termination mechanism may enable an energy efficient inductive power transfer system to draw power only when required and to shut down when not needed thereby reducing energy wastage.

If no end-of-charge command is detected, the regulator may be configured to compare the output of the secondary inductor to at least one reference value—step 1648. For example, the regulator may compare secondary voltage to reference values stored in a memory element. Alternatively, reference values may be calculated by a processing unit associated with the inductive power receiver to suit requirements.

If the power is below a first lower threshold value—step 1650, a first power increase signal P-UP may be sent to the inductive power outlet—step 1658. The regulator may further compare the power to a second threshold value—step 1652, if the power is also lower than the second threshold value a second power increase signal P-DUP may be sent to the inductive power outlet—step 1656.

Where the power is above the first lower threshold value, the power may be compared to at least one an upper threshold value—step 1654. If the power level is greater than the upper threshold value, then a power decrease signal P-DOWN may be sent to the inductive power outlet—step 1660.

It is particularly noted that where the power level is neither greater than the upper threshold value nor lower than the lower threshold value, then a perpetuation signal P-SAME may be sent to the inductive power outlet—step 1662. Thus when even when no action is required a signal is sent at least one instruction signal may be sent to the inductive power outlet during each time duration. Accordingly, the inductive power receiver may periodically indicate its continued presence to the inductive power outlet. It will be appreciated that when the inductive power receiver is removed from the inducitive power outlet, no instruction signals will be passed therebetween. As indicated above in relation to FIG. 16B, the inductive power outlet may be configured to shut down when no such signal is received.

Although only five instruction signals are described hereinabove, other instruction signals may be additionally be transferred as required. Various instructions may occur to those skilled in the art, for example indicating that the power is outside still further threshold values, requesting greater power resolution or such like.

Figure 17:
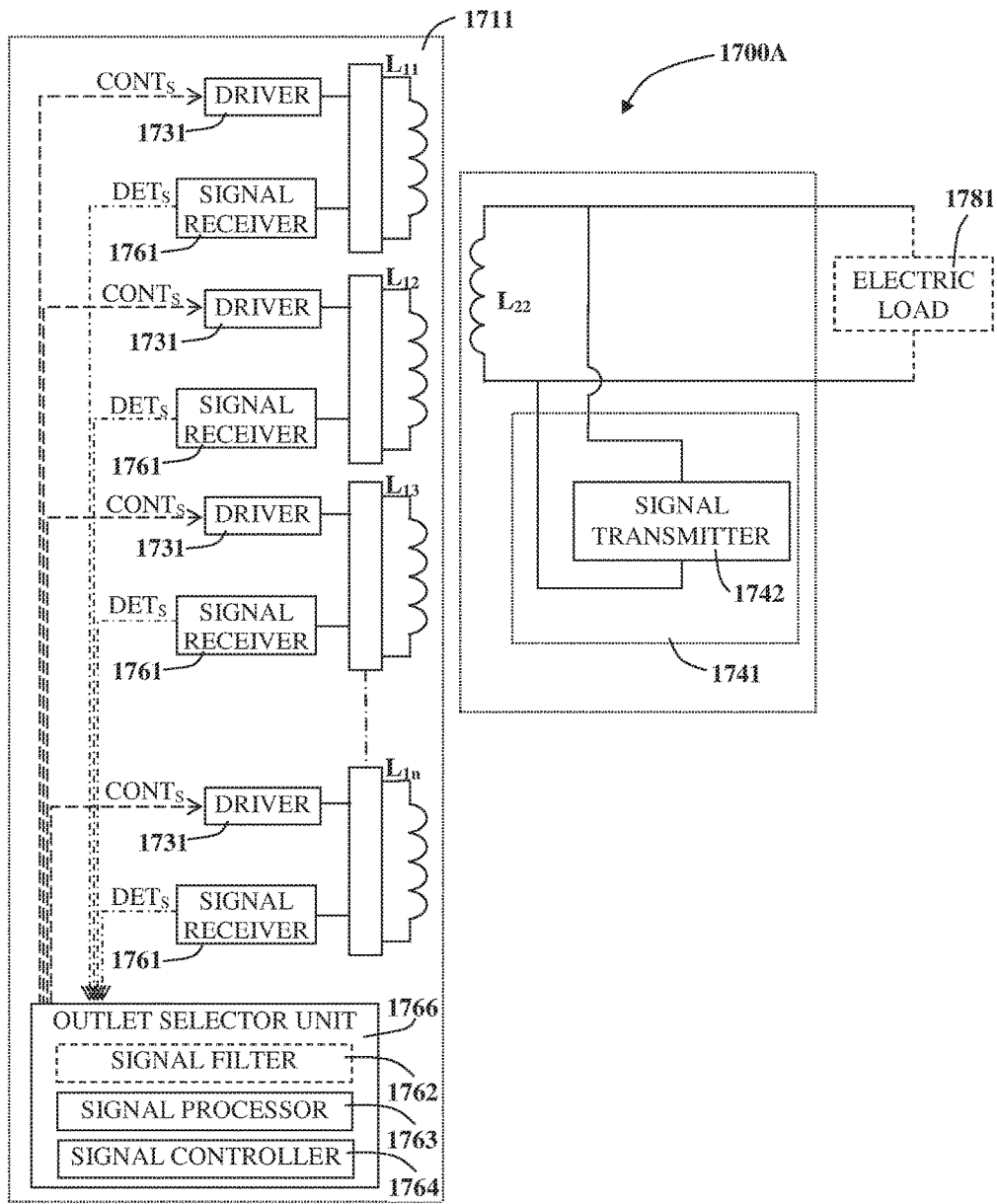
FIG. 17 is a schematic representation of a possible signal transfer system for locating a power receiver having placed upon a multi-outlet power transmission surface.

Reference is now made to FIG. 17, illustrating a possible signal transfer system 1700A according to yet another embodiment of the invention. The signal transfer system 1700A is used for locating a power receiver having a secondary coil $L_{22}$ wired to an electric load 1781, which is placed somewhere over a multi-outlet power transmission surface 1711, enabling selection of a wireless power outlet of the multi-outlet power transmission surface closest to the location of the power receiver.

It is noted that when referring to the closest location, it is not necessarily represented by the shortest physical distance, rather may be referring to the closest effective location based upon signal communication analysis.

The multi-outlet power transmission surface 1711 comprises an array of wireless power outlets, each having a primary coil indicated by $L_{11}$, $L_{12}$, and $L_{13}$ through to $L_{1n}$ where each primary coil is connected to a driver 1731 wired to a power source (not shown) and to a reception circuit of a signal receiver 1761. The signal transfer system 1700A includes a transmission circuit 1741 wired to the secondary coil $L_{22}$ of a power receiver where the transmission circuit 1741 includes a signal transmitter 1742 operable to transmit detection signals ($DET_S$).

Each signal receiver 1761 of the primary inductive coil $L_{1n}$, is configured to forward a detection signal ($DET_S$) received from the signal transmitter unit 1742 to the outlet selector unit 1766, optionally through a signal filter 1762, filtering the detected communication signals for known communication signal frequencies. The filtered detected signals may be forwarded for signal-to-noise ratio (SNR) analysis by the signal processing unit 1763. The signal processing unit 1763 may serve various analysis requirements, such as to identify which primary inductive coil $L_{1n}$ is closest effectively to the secondary inductive coil $L_{22}$. When a secondary coil $L_{22}$ is detected, the signal controller 1764 drives the driver 1731 to operate the primary inductive coil $L_{1n}$ closest to the secondary inductive coil $L_{22}$ at a high power.

Accordingly, the current architecture of the signal transfer system 1700A, each primary inductive coil $L_{1n}$ may have a sensing mechanism and may use a signal receiver 1761 without a limiting multiplexer, as may be the case when prior art architectures are considered. Further, the sensing mechanism and the activation of the closest wireless power outlet may be operable to transmit a control signal, triggered by the processing unit 1763 as a result of the signal-quality computation. The driver 1731 is configured to selectively operate each primary inductive coil $L_{1n}$, in turn, upon receiving a control signal identified as the primary inductive coil which is closest effectively to the secondary inductive coil $L_{22}$. Further, when a secondary coil $L_{22}$ is detected, the driver 1731 may be configured to operate the primary inductive coil $L_{1n}$ closest effectively to the secondary inductive coil $L_{22}$ at a high power.

The signal transfer system architecture, for example, based upon SNR analysis or the like, as described hereinabove, may have various possible applications and commercial uses, such as:

Power Transmission Surfaces may allow a wide active range for different shapes of receiver sizes.

In-vehicle power transmission surfaces may provide power transfer in transit, to receiver units which may be prone to movements while in motion.

It is noted that the architecture of the signal transfer system coupled with SNR based analysis may require only fine-tuning the SNR thresholds per specific product, avoiding the need for knowing coil specific parameters, coil specific structure, coil-array topology and/or coil-array overlapping, or defining a coil-array specific configuration. Accordingly, power related computations may not be required.

It is further noted that the processing unit 1763 of the signal transfer system 1700A is further operable to perform other digital signal analysis methods in addition to or alongside signal-to-noise-ratio.

Reference is now made to the flowchart of FIG. 18 representing selected actions illustrating possible method 1800A for selecting the closest wireless power outlet and driving its associated primary inductor. Such a method covers the possible interactions between the various components of the signal transmission system including the power receiver (having a secondary coil $L_{22}$, FIG. 17), signal receivers (1761, FIG. 17), outlet selector unit (1766, FIG. 17) and the driver (1731, FIG. 17).

The method 1800A may be triggered by a power receiver (having a secondary coil $L_{22}$, FIG. 17) transmitting a communication signal—step 1802, continually to all signal receivers; the transmitted communication signals are detected by all signal receivers (1761, FIG. 17)—step 1804 through 1810; the outlet selector unit (1766, FIG. 17) may receive multiple detected signals (DETs)—step 1812 through its signal filter (1762, FIG. 17); and further moved to the processing unit (1763, FIG. 17) to perform the analysis based upon signal-to-noise ratio (SNR), identifying the closest wireless power outlet—step 1814; thereafter, the signal controller (1764, FIG. 17) triggers the driver (1766, FIG. 17) to drive the selected wireless power outlet—step 1816 by transmitting a control signal ($CONT_S$) to the primary inductive coil $L_{1n}$ to initiate power transfer from the selected wireless power outlet.

It is noted that the signal-to-noise ratio (SNR) analysis comprises computing a value based upon at least one of (a) the level of power reduction over time, (b) the shifting of frequency and (c) signal's phase rotation of received signal compared to the original profile of the communication signal, upon transmission.

It is further noted that when referring to frequency filtering, various filters may be applied to the detected communication signals to determine the signal-quality, and filter for known communication signal frequencies. Accordingly, based upon identifying signal-quality and high correlation between distance and signal-quality, the wireless power outlet effectively closest to the power receiver may be determined.

Figure 19A:
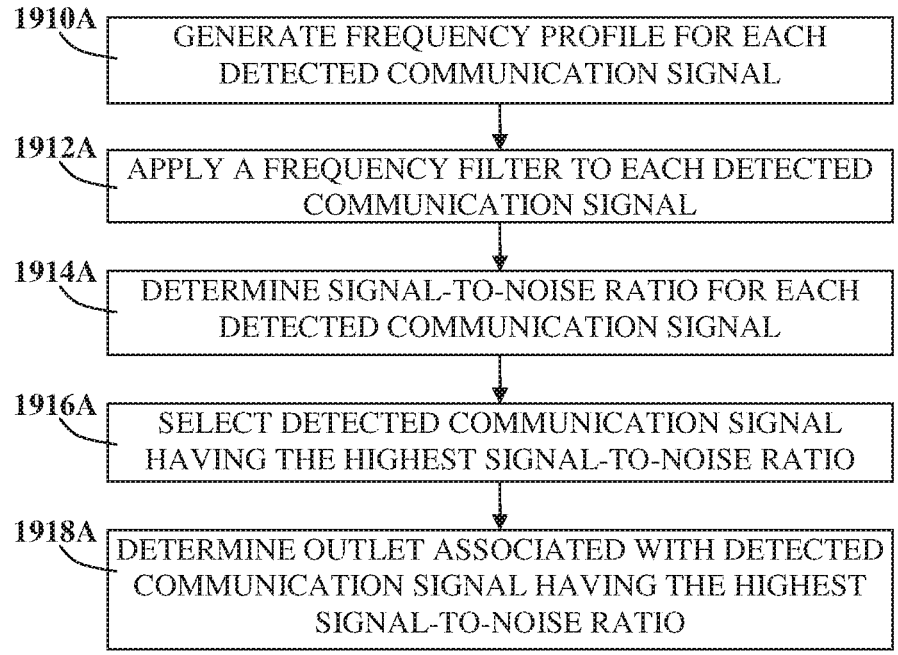
FIG. 19A is a flowchart representing selected actions illustrating a possible method for determining the wireless power outlet with the best signal-to-noise ratio (SNR)

Reference is now made to the flowchart of FIG. 19A representing selected actions illustrating possible method for determining the wireless power outlet with the best signal-to-noise ratio (SNR).

The current disclosure offers a new analysis approach of digital signal processing, using possibly SNR based analysis to determine signal-quality as described hereinabove, enabling reduction of the dependency on coil structure and characteristics or configuration, compared to traditional power and inductance measurements. Further, the signal-quality analysis approach makes it protocol agnostic, as long as a communication of in-band channel exists and allows re-sensing periodically while in the process of power transfer.

The method may include generating a frequency profile for each detected communication signal—step 1910A; applying a frequency filter to each detected communication signal—step 1912A; determining signal-to-noise ratio (SNR) for each detected communication signal—step 1914A; selecting detected communication signal having the best signal-to-noise ratio (SNR)—step 1916A; and determining the outlet associated with detected communication signal having the best signal-to-noise ratio (SNR) score—step 1918A.

Figure 19B:
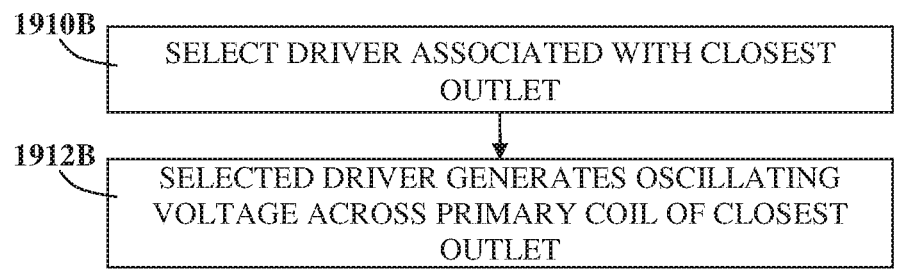
FIG. 19B is a flowchart representing selected actions illustrating a possible method for driving the selected wireless power outlet to allow power transfer.

Reference is now made to the flowchart of FIG. 19B representing selected actions illustrating possible method for driving the selected wireless power outlet to allow power transfer.

The method may include selecting the driver (9231, FIG. 17) associated with the closest wireless power outlet—step 1910B, following the identification process based upon signal-quality computation of the plurality of communication signals, transmitted by a power receiver, placed over the wireless power transmission surface; and the selected driver, upon receiving a control signal from the signal controller (9164, FIG. 17), generating oscillating voltage across the closest primary coil ($L_{1n}$, FIG. 17) associated with the wireless power outlet—step 1912B.

Figure 19C:
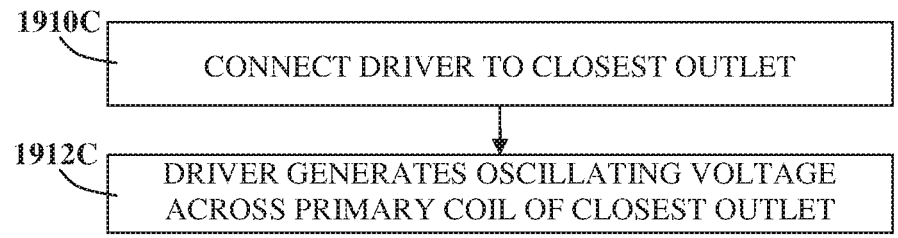
FIG. 19C is a flowchart representing selected actions illustrating another possible method for driving the selected wireless power outlet to allow power transfer.

Reference is now made to the flowchart of FIG. 19C representing selected actions illustrating another possible method for driving the selected wireless power outlet to allow power transfer.

The method may include connecting the driver (9231, FIG. 17) associated with the closest wireless power outlet—step 1910C; and the selected driver, upon receiving a control signal, generating oscillating voltage across the closest primary coil ($L_{1n}$, FIG. 17) associated with the wireless power outlet—step 1912C.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims.

Additionally, the various embodiments set forth hereinabove are described in term of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A method for selecting a wireless power outlet from a multi-outlet power transmission surface for transferring power to at least one power receiver having a secondary coil connectable to an electric load, wherein said at least one power receiver is configured to transmit communication signals, and said multi-outlet power transmission surface comprises:

a power transmission system, comprising an array of wireless power outlets, each said power outlet being associated with a primary coil connectable to a driver; and a signal transfer system, said signal transfer system comprising at least one signal receiver unit associated with each said power outlet of the array, and a processing unit in communication with said at least one signal receiver unit, the method comprising:

detecting said communication signals from said at least one power receiver;

analyzing signal-quality of each said detected communication signal by calculating its deviation from an associated transmitted signal profile; and selecting the wireless power outlet having the detected communication signal with required signal-quality.

2. The method of claim 1, wherein said required signal-quality is characterized by values of the deviation, wherein the deviation is selected from the group consisting of level of power reduction, shift of frequency, signal's frequency phase shift, signal's frequency phase rotation, and any combination thereof.

3. The method of claim 1, further comprising the step of said signal transfer system, activating the primary coil associated with the selected wireless power outlet.

4. The method of claim 1, wherein obtaining a signal-to-noise-ratio value of each said detected communication signal, comprises:

said signal transfer system, obtaining original communication signal profile;

said signal transfer system, obtaining received communication signal profile; and said signal transfer system, computing a deviation value of said received communication signal profile from said original communication signal profile, wherein said deviation value is based upon at least one of level of power reduction over time, shift of frequency, and signal phase rotation.

5. The method of claim 1, wherein said step of analyzing signal-quality comprises applying frequency filters to said detected communication signals.

6. The method of claim 5, wherein said applying frequency filters, comprises:

said signal transfer system, performing a Fast Fourier Transform (FFT) to said detected communication signals; and said signal transfer system, filtering for known communication signal frequencies.

7. The method of claim 1, wherein said step of selecting the wireless power outlet having the detected communication signal with required signal-quality comprises identifying the wireless power outlet closest to the location of said at least one power receiver.

8. The method of claim 3, further comprising the step of said signal transfer system, performing digital signal analysis of said signal-to-noise ratio.

9. The method of claim 3, further comprising the step of said signal transfer system, monitoring the signal-quality of said detected communication signals continuously during power transmission such that any displacement of said at least one power receiver is detectable.

10. The method of claim 3, further comprising the steps of:

said signal transfer system, selecting at least a second wireless power outlet; and said signal transfer system, swapping said selected wireless power outlet with at least said second wireless power outlet.

11. The method of claim 1, wherein said step of selecting the wireless power outlet having the detected communication signal with required signal-quality further comprises selecting multiple wireless power outlets.

12. The method of claim 11, wherein said selecting multiple wireless power outlets further comprises activating the multiple wireless power outlets selected.

13. The method of claim 11, wherein said selecting multiple wireless power outlets further comprises de-activating the multiple wireless power outlets selected.

14. A multi-outlet power transmission surface for transmitting power wirelessly to at least one power receiver having a secondary coil connectable to a power load, said at least one power receiver is configured to transmit communication signals, said power transmission surface comprising:

a power transmission system, comprising an array of wireless power outlets, each said power outlet is associated with a primary coil connectable to a driver wired to a power source, said primary coil connected inductively to said secondary coil when activated;

a signal transfer system, comprising:

at least one signal receiver unit associated with each said power outlet of the array, said signal receiver unit operable to detect said communication signals via its associated power outlet; and a processing unit in communication with said at least one signal receiver unit;

wherein said processing unit is operable to analyze signal-quality of each detected communication signal by obtaining a signal-to-noise ratio value of each said detected communication signal and thereby to identify the wireless power outlet closest to the location of said at least one power receiver.

15. The multi-outlet power transmission surface of claim 14, wherein said processing unit is operable to obtain said signal-to-noise ratio quality value by computing a value based upon at least one of the level of power reduction over time, the shifting of frequency, and signal phase rotation.

16. The multi-outlet power transmission surface of claim 14, wherein said processing unit further comprises frequency filters operable to determine signal-quality of said detected communication signals.

17. The multi-outlet power transmission surface of claim 14, wherein said processing unit is operable to perform a Fast Fourier Transform (FFT) to said detected communication signals thereby filtering for known communication signal frequencies.

18. The multi-outlet power transmission surface of claim 14, wherein the wireless power outlet closest to the location of said at least one power receiver is identified by comparing said signal-quality value of said detected communication signals.

19. The multi-outlet power transmission surface of claim 14, wherein said signal transfer system is further operable to perform digital signal analysis of said signal-to-noise-ratio.

20. The multi-outlet power transmission surface of claim 14, wherein said signal transfer system is operable to monitor the signal-quality of said detected communication signals continuously during power transmission such that any displacement of said at least one power receiver is detectable.

21. The multi-outlet power transmission surface of claim 14, further comprising a controller in communication with said processing unit, said controller operable to activate the wireless power outlet closest to the location of said at least one power receiver.

22. The multi-outlet power transmission surface of claim 14, wherein said signal transfer system is operable to select at least a second wireless power outlet and to swap said selected wireless power outlet with at least said second wireless power outlet.

23. The multi-outlet power transmission surface of claim 14, wherein said signal transfer system is operable to select multiple wireless power outlets.

* * * * *